United States Patent [19]

Tabata et al.

[11] Patent Number: 4,994,646
[45] Date of Patent: Feb. 19, 1991

[54] PULSE ARC DISCHARGE WELDING APPARATUS

[75] Inventors: Yoichiro Tabata; Shigeo Ueguri; Yoshihiro Ueda, all of Hyogo, Japan

[73] Assignee: Mitsubishi Denki Kabushiki Kaisha, Hyogo, Japan

[21] Appl. No.: 353,430

[22] Filed: May 18, 1989

[30] Foreign Application Priority Data

May 19, 1988 [JP] Japan .............................. 63-122508
Oct. 20, 1988 [JP] Japan .............................. 63-265083

[51] Int. Cl.$^5$ ............................................. B23K 9/09
[52] U.S. Cl. ......................... 219/130.51; 219/137 PS
[58] Field of Search ..................... 219/130.51, 137 PS

[56] References Cited

U.S. PATENT DOCUMENTS

| 3,894,210 | 7/1975 | Smith et al. | 219/130.51 |
| 4,273,988 | 6/1981 | Iceland et al. | 219/130.51 |
| 4,427,874 | 1/1984 | Tabata et al. | 219/130.51 |
| 4,438,317 | 3/1984 | Ueguri et al. | |
| 4,594,498 | 6/1986 | Ueguri et al. | |

FOREIGN PATENT DOCUMENTS 0043589 1/1982 European Pat. Off. .
5719177 2/1982 Japan .
57-187178 11/1982 Japan .

OTHER PUBLICATIONS

Welding Journal, Aug. 1985, "Study of Metal Transfer in Pulsed GMA Welding" by S. Ueguri, et al, pp. 242s–250s.
European Search Report.

Primary Examiner—Clifford C. Shaw
Attorney, Agent, or Firm—Sughrue, Mion, Zinn, Macpeak & Seas

[57] ABSTRACT

A pulse arc discharge welding apparatus comprising a pulse current waveform control circuit for periodically outputting a pulse current group consisting of a plurality of pulses, pulse arc current supplying means for outputting a pulse arc current according to an output of said pulse current waveform control circuit and an arc welding means for performing pulse arc discharge with an output of said pulse arc current supplying means, to carry out a pulse arc welding operation. In such a pulse arc discharge welding apparatus, with a discharge current waveform provided in the form of high frequency pulses, the discharge light and the gas in pulse discharge and the electrode are regulated and controlled with high accuracy.

18 Claims, 35 Drawing Sheets

FIG. 18

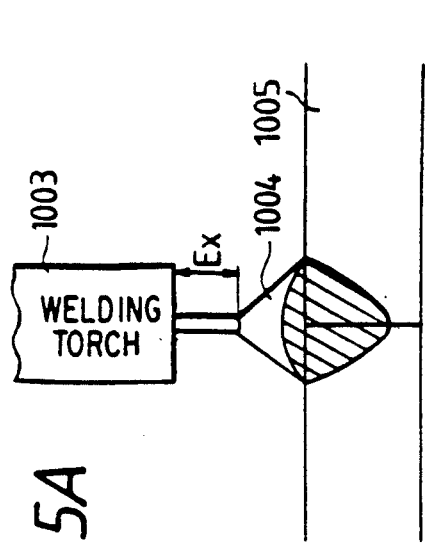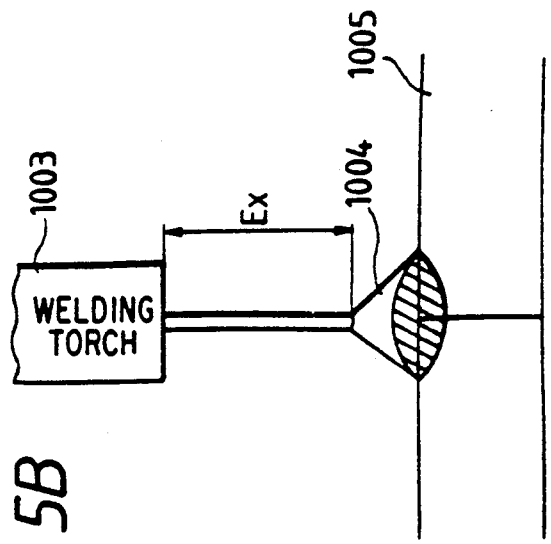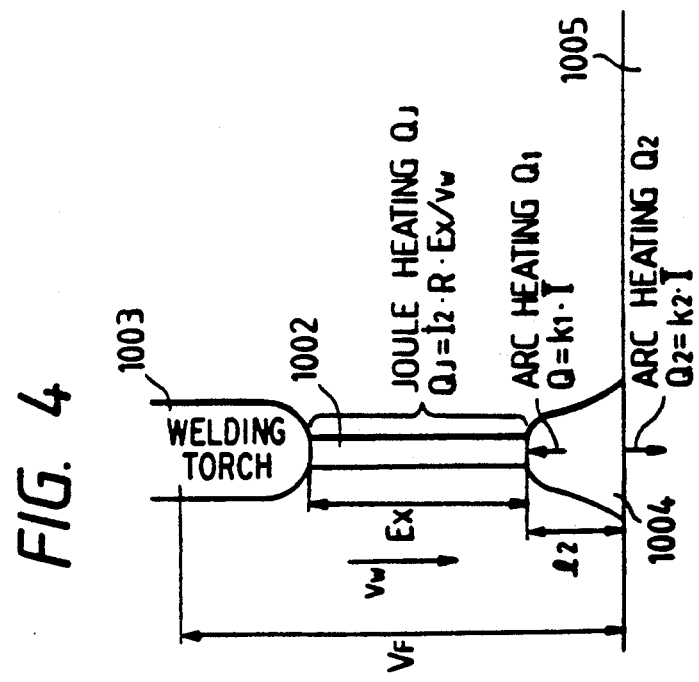

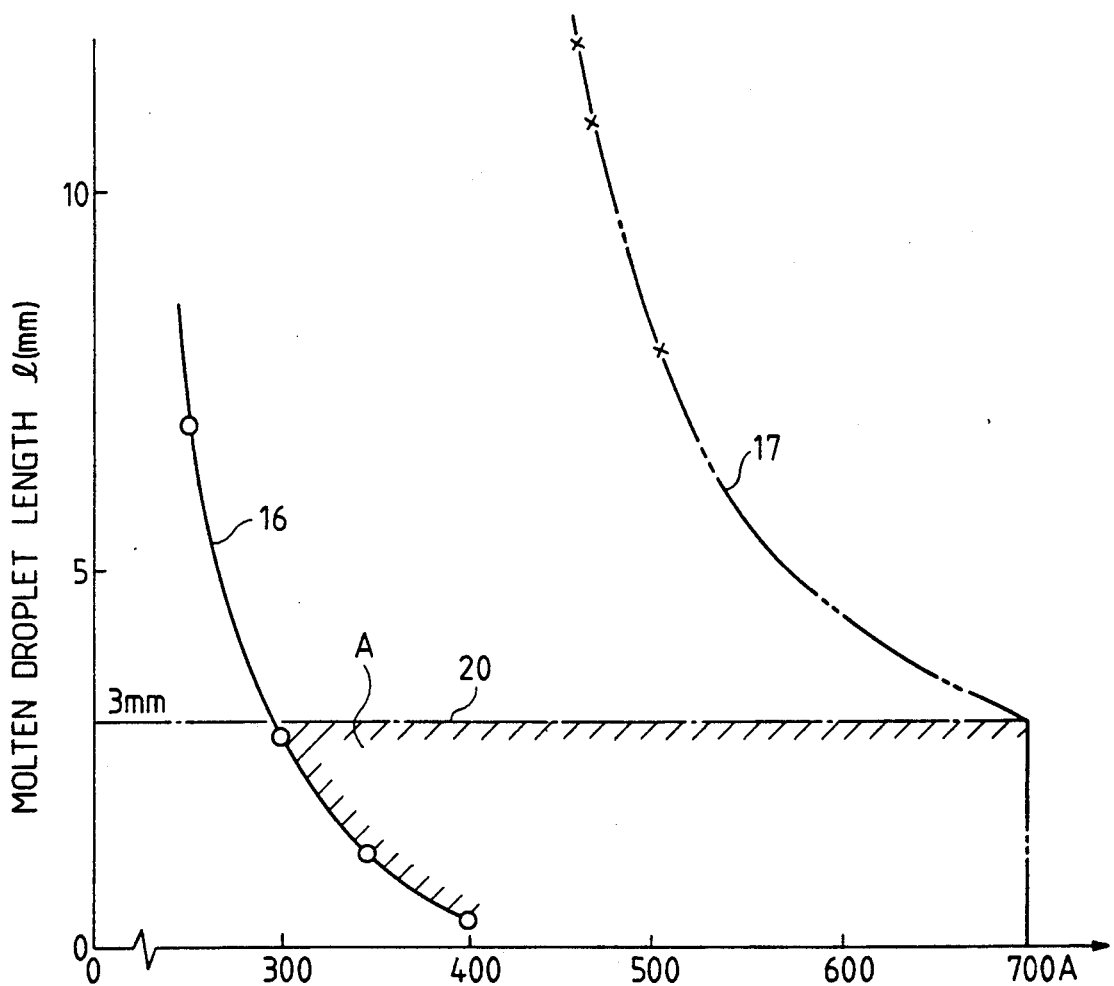

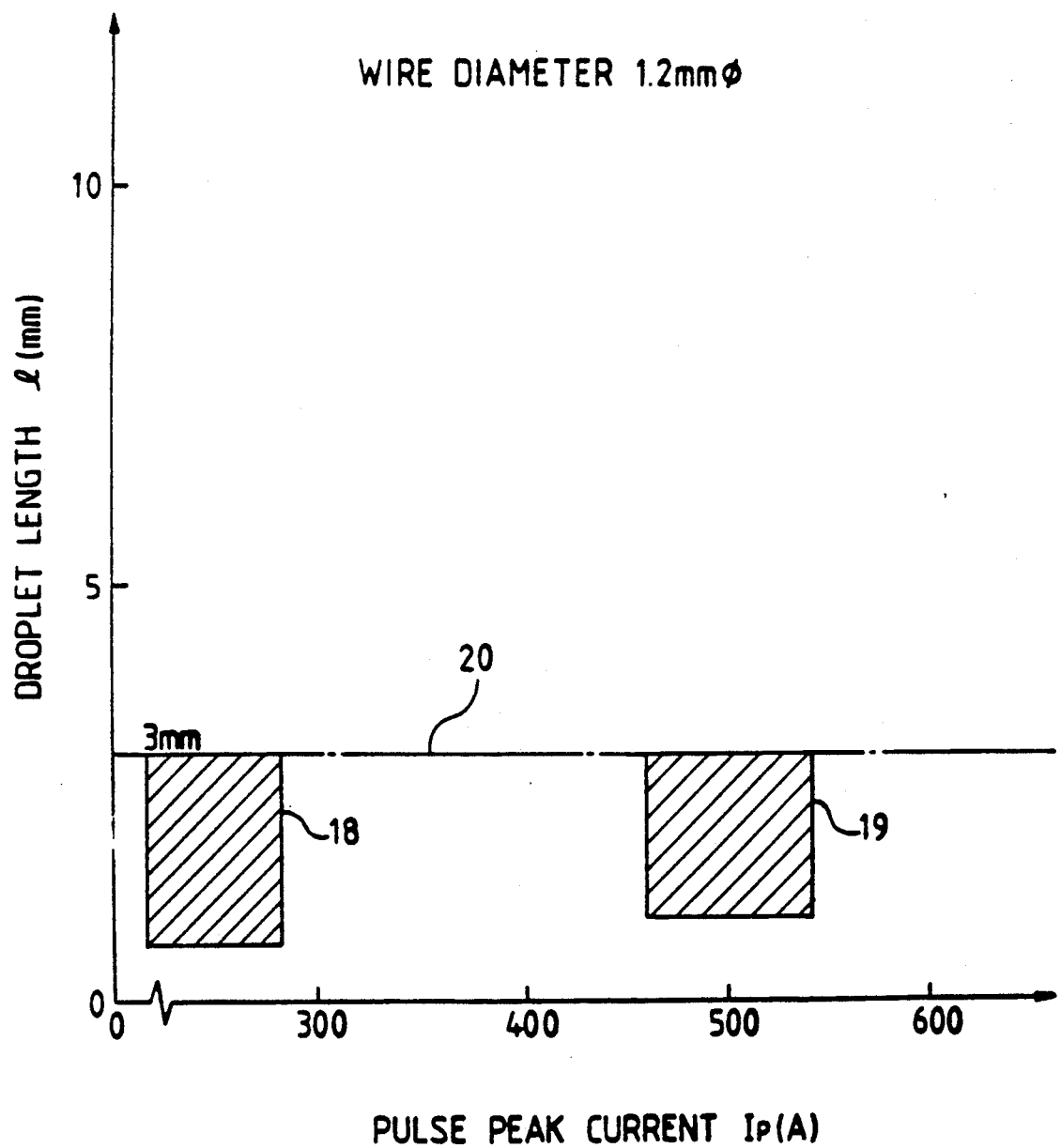

FIG. 26
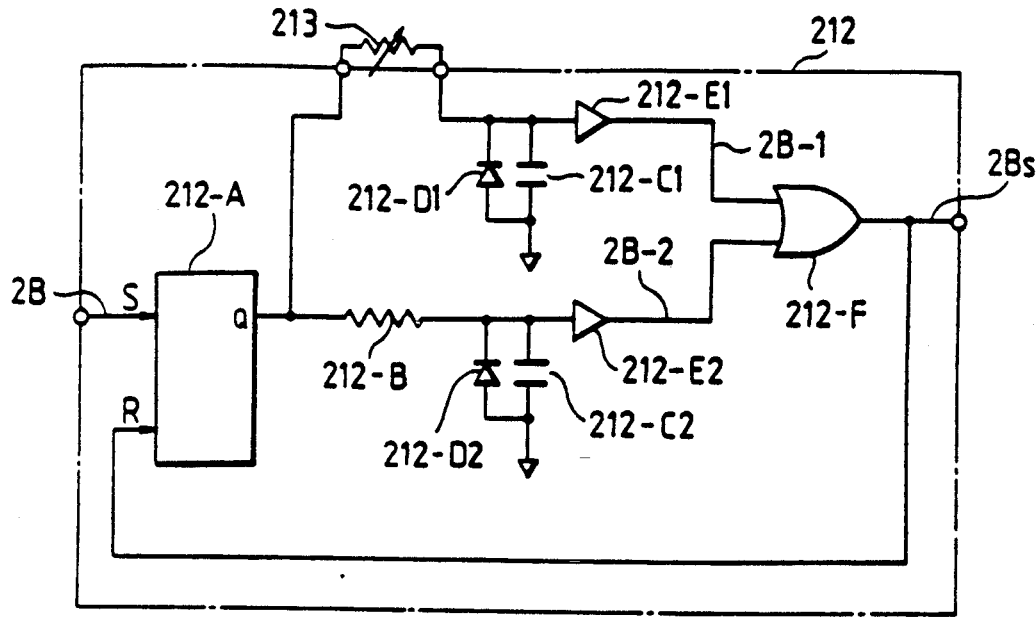
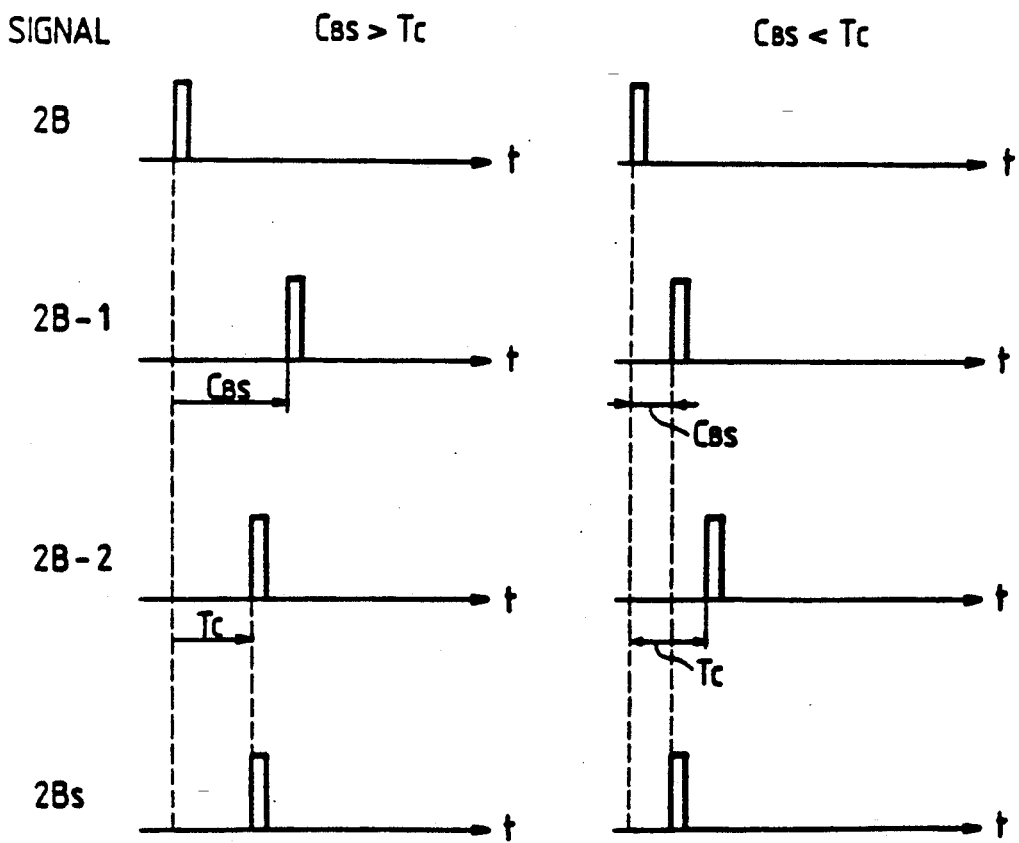

FIG. 28A
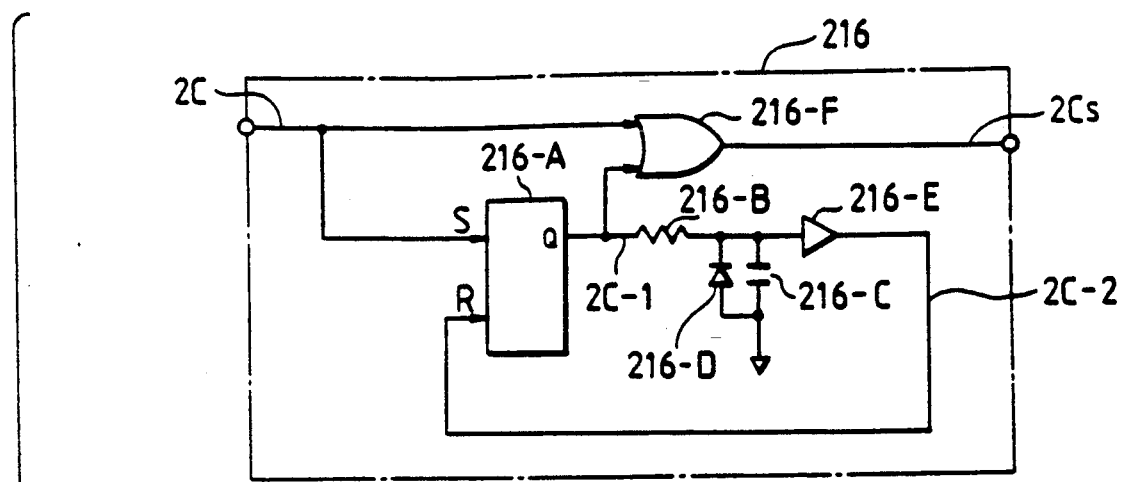
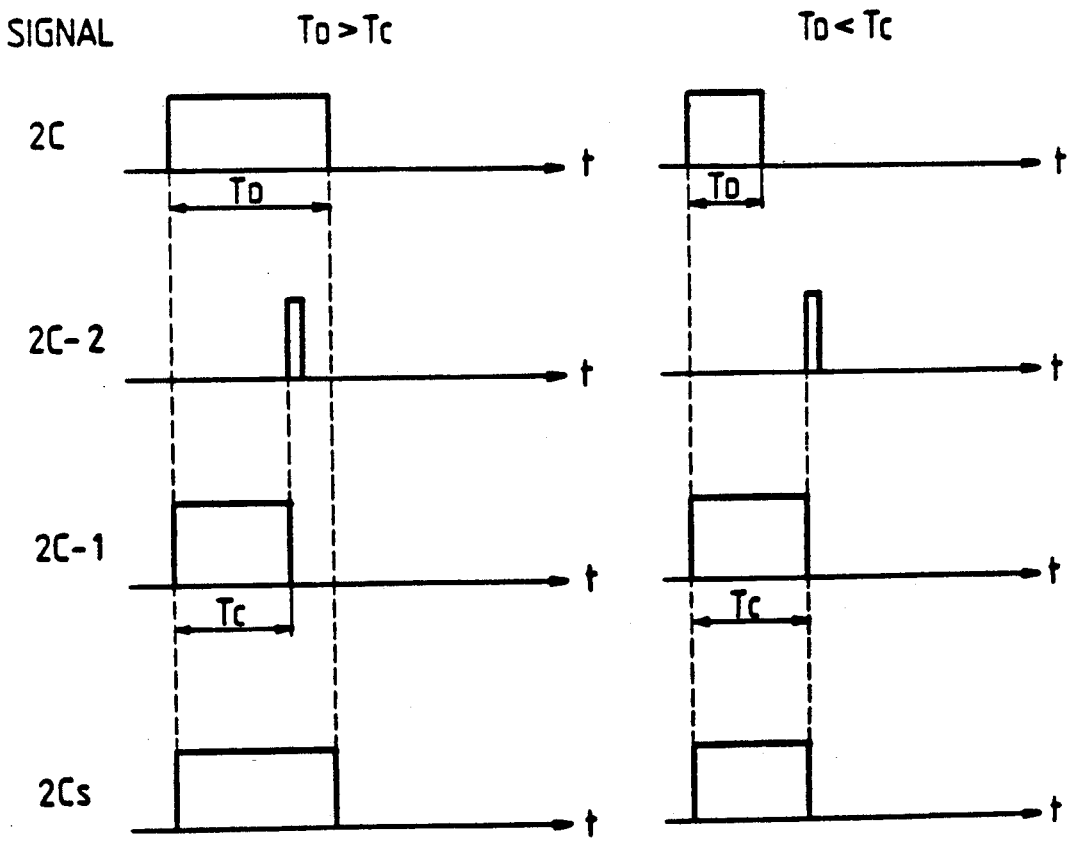

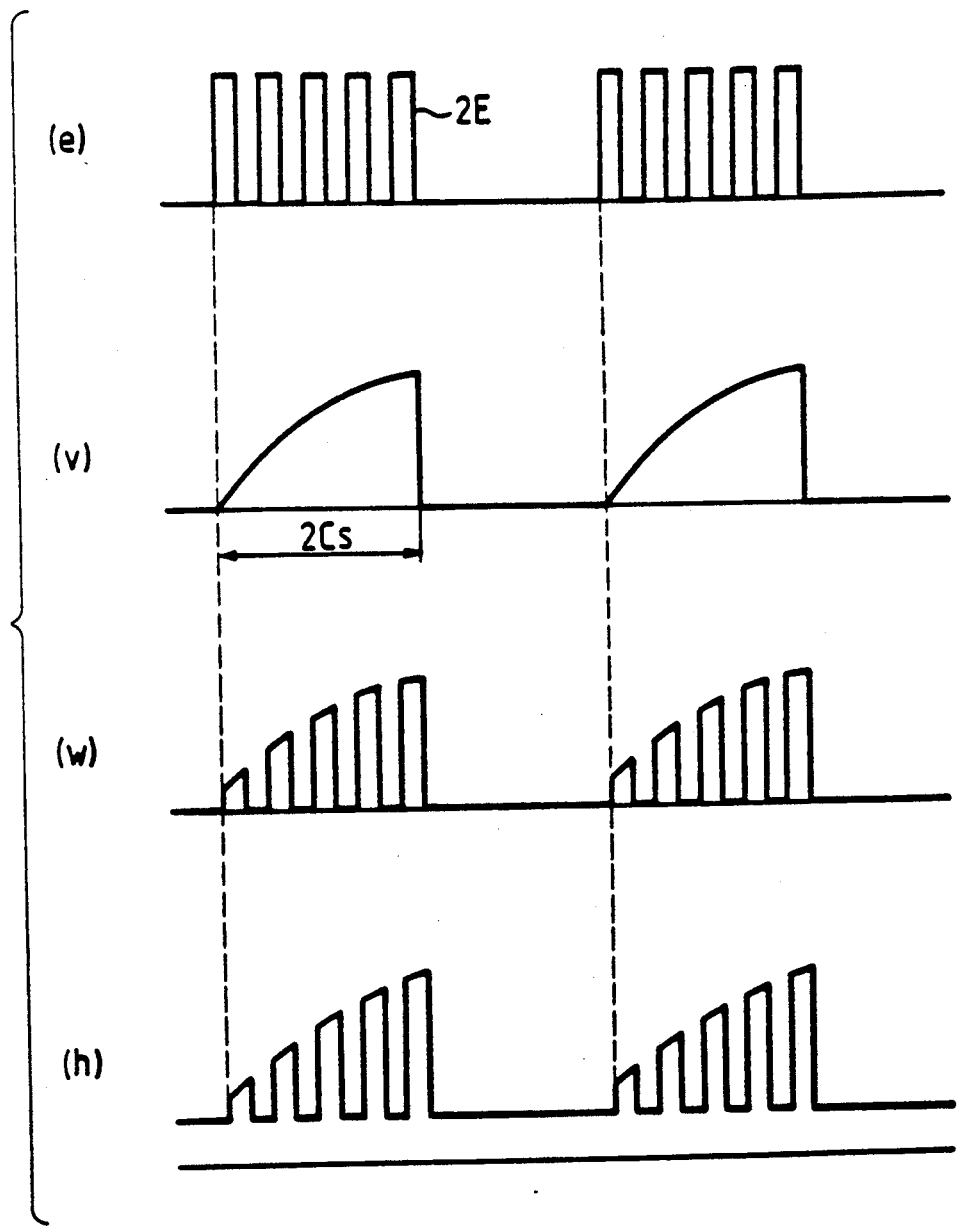

(h)

(h)

(h)

(h)

(h)

(h)

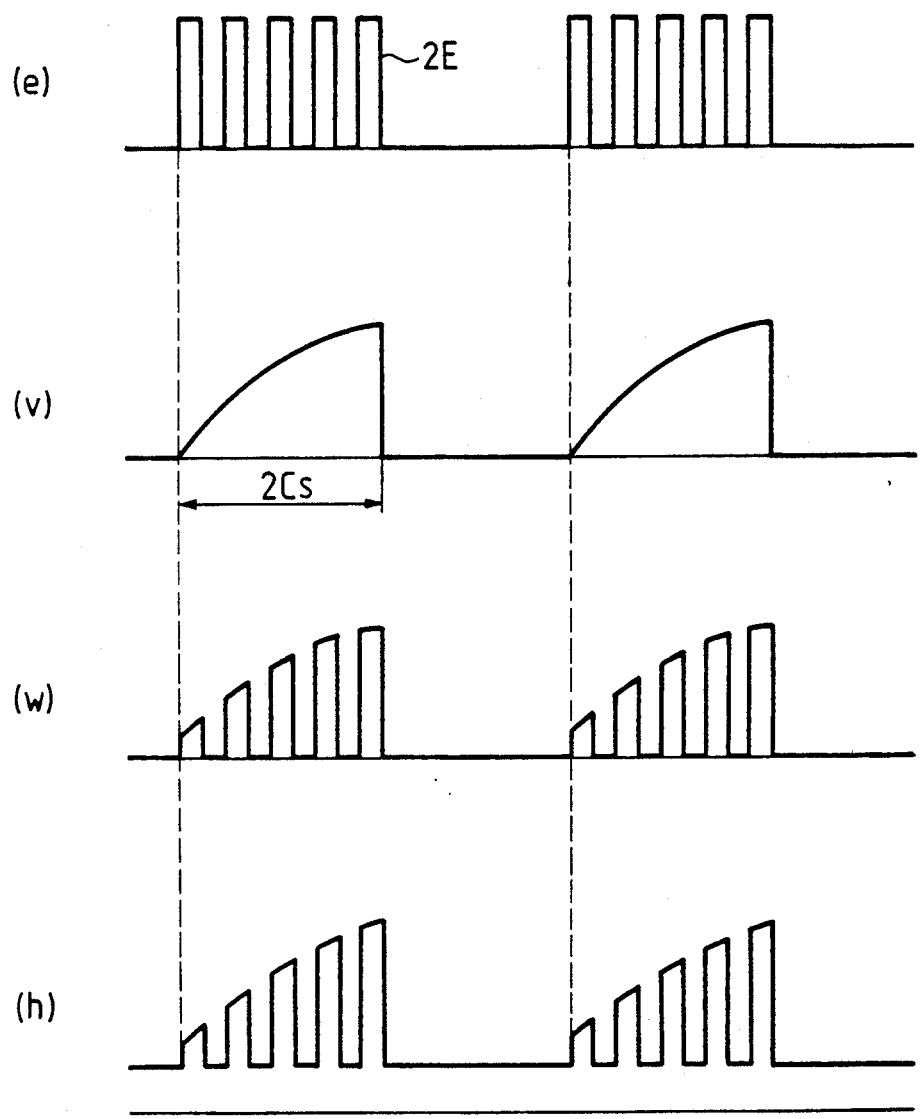

PULSE ARC DISCHARGE WELDING APPARATUS

BACKGROUND OF THE INVENTION

This invention relates to a pulse arc discharge welding apparatus, and more particularly to a pulse arc discharge welding apparatus in which, with a discharge current waveform provided in the form of high frequency pulses, the discharge light and the gas in pulse discharge and the electrode are regulated and controlled with high accuracy.

The pulsed arc discharge apparatus can prevent variations in the depth of penetration and in the area of section of a base metal which contributes for instance to the variation in height of the welding torch.

An example of the pulse discharge operated apparatus of this type is a pulse arc discharge welding apparatus where a pulse arc current flows between a consumable welding wire electrode (hereinafter referred to merely as "a wire electrode", when applicable) and an object to be welded, to generate heat through pulse arc discharge, so that the heat melts the object and a filter metal, while the melted filter metal is moved to the welding part of the object by the electromagnetic pinch force of pulse arc discharge, thus accomplishing the welding. FIG. 1 shows a conventional pulsed arc discharge apparatus disclosed, for instance, by Japanese Patent Application (OPI) No 19184/1982 (the term "OPI" as used herein means an "unexamined published application"). In FIG. 1, reference numeral 1001 designates a pulsed arc welding power source; 1002, consumable electrode wire (hereinafter referred to as "a welding wire" when applicable); 1003, a welding torch; 1004, discharge arcs; 1005, a base metal; 1006, a voltage detector for detecting a voltage $V_F$ developed across the welding torch 1003 and the base metal 1005; 1007, a comparator for comparing the voltage $V_F$ detected with a predetermined welding voltage $V_o$, to output the difference voltage Of $(V_o - V_F)$; 1008, welding a voltage setting unit for setting the above-described welding voltage $V_o$; 1009, a pulse peak value setting unit for setting a pulse peak value $I_P$; 1010, a base current setting unit for setting a base current $I_B$; and 1011, a pulse width setting unit for setting a pulse width $\tau$. Further in FIG. 1, reference character Ex designates the length of extension of the welding wire 1002, $\lambda a$, an arc length; and $\lambda x$, the distance between the welding torch 1003 and the base metal 1005. The pulse arc welding power source 1001 includes a pulse waveform shaping section, which is not shown for simplification in description.

The construction of the conventional pulsed arc discharge apparatus is as described above. With the pulsed arc welding power source, the current obtained by superposing a pulse current shown in FIG. 2A or FIG. 2B (the pulse peak value $I_P$, and the pulse width $\tau$) On the DC base current $I_B$ is applied between the welding wire 1002 and the base metal 1005, so that pulsed arc discharge 1004 is caused to occur between the welding wire 1002 and the base metal 1005; that is, a welding operation is carried out. The welding wire 1002 is fed continuously towards the base metal 1005. The welding wire 1002 thus fed is melted by the pulsed arc discharge 1004, thus being transferred to the base metal 1005. In general, the speed of feeding the welding wire 1002 is proportional to the pulse period.

When the height of the welding torch 1003 changes or the base metal 1005 bends, the distance $\lambda x$ between the welding torch 1003 and the base metal 1005 is changed, and accordingly the arc length $\lambda a$ is changed. In order to overcome this difficulty, in the conventional pulsed arc discharge apparatus, the following feedback control is employed:

The voltage detector 1006 detects the voltage $V_F$ at all times. The comparator 1007 compares the voltage $V_F$ thus detected with the welding voltage $V_o$ set by the welding voltage setting unit 1008, to output the difference voltage $(V_O - V_F)$ signal. The difference voltage signal iS applied to the pulse Width setting unit 1011. In the pulse width setting unit 1011, the control pulse data $\Delta \tau$ is made to be a function of the difference voltage $(V_O - V_F)$, and the pulse width $\tau$ is processed so as to be $(\tau_0 \pm \Delta \tau)$. Let us consider the case where the shield gas is $CO_2$ gas, the welding wire feeding speed Vw is 7 m/min, the pulse peak value $I_P$ is 500A, and the base current $I_B$ is 60A. If, when the distance $\lambda x$ between the welding torch 1003 and the base metal 1005 is changed and the length of extension Ex is accordingly changed from 15.8 mm to 20.4 mm as shown in FIG. 3, the pulse width $\tau$ is changed from 4.0 ms to 3.6 ms, then the resultant arc length $\lambda a$ is substantially equal to that in the case where the length of extension Ex is 15.8 mm.

This principle will be described with reference to FIG. 4 in detail.

FIG. 4 is an enlarged diagram showing the welding section. In FIG. 4, reference character $V_F$ designates the voltage developed across the welding torch 1003 and the base metal 1005; Vw, the speed at which the welding wire 1002 is continuously fed; Ex, the length of extension of the welding wire 1002 between the electric feeder of the welding torch and the discharge arc; $Q_J$, the quantity of heat with which the welding wire 1002 is Joule-heated while moving from the electric feeder of the welding torch to the arc; $\bar{I}$, the effective value $$\bar{I} = \sqrt{\frac{1}{T}[I_P^2 \cdot \tau + I_B^2(T - \tau)]}$$

of the pulse current; R, the resistance per unitary length of the welding wire 1002; $Q_1$, the quantity of heat applied to the welding wire 1002 by arc discharge 1004; $k_1$, the proportional constant determined from the diameter and material of the welding wire; $\bar{I}$, the average current $(I = (1/T)[I_P \tau + I_B(T - \tau)]$; $Q_2$, the quantity of heat applied to the base metal by arc diSCharge 1004; and $k_2$, the proportional constant determined from the gas, and the configuration and material of the base metal.

As shown in FIG. 4, the quantity of heat $Q_w$ applied to the welding wire 1002, the quantity of heat $Q_J$, and the quantity of heat $Q_1$ can be calculated accOrding to the following expressions, respectively:

$$Q_w = Q_J + Q_1$$

$$Q_J = \bar{I}^2 \cdot R \cdot Ex/Vw$$

$$Q_1 = k_1 \bar{I}$$

The amount of melting of the welding wire 1002, being proportional to the quantity of heat $Q_w$ applied to the welding wire 1002, forms a molten drop at the end of the welding wire 1002. The molten drop is transferred to the base metal 1005 by the pulse current.

Thus, the arc length $\lambda a$ is determined where the welding wire feeding speed Vw is made in balance with the number of molten drops transferred to the base metal 1005. In other words, in order to maintain the arc length λa constant, it is necessary to maintain the quantity of heat $Q_w$ constant in the following equation (1):

$$Q_w = Q_J + Q_1 = (I^2 \cdot R \cdot Ex/Vw) + k_1 \bar{I} \qquad (1)$$

When, as was described with reference to FIG. 3, a welding operation is carried out with Ex=15.8 mm, the arc length λa can be held at the most suitable value with a pulse width τ of 4.0 ms, and in this case the effective current $\hat{I}$ is 263A, and the average current $\bar{I}$ is 177A. In the case where the length of extension Ex is changed from 15.8 mm to 20.4 mm, the arc control on pulse width τ is effected, so that the pulse width τ is decreased to 3.6 ms so that the arc length λa is maintained at the value provided when Ex=15.8 mm. As a result, the effective current $\hat{I}$ becomes 250A while the average current $\bar{I}$ is 166A, and the quantity of heat $Q_w$ is maintained unchanged.

In the conventional pulsed arc discharge apparatus as described above, in order to prevent the variation of the arc length λa caused by the variation in the length of extension Ex of the welding wire 1002, the arc length control on pulse width τ is carried out. In this case, not only the effective current $\hat{I}$ but also the average current $\bar{I}$ is changed. When the average current $\bar{I}$ changes, the quantity of heat $Q_2$ applied to the base material 1005 by arc discharge 1004 is changed. As a result, as shown in FIGS. 5A and 5B, the weld penetration is changed in sectional area. If the sectional area of the weld penetration is small, then the welding strength is reduced correspondingly.

The pulse arc discharge welding apparatus will be described in more detail. FIG. 6 is an explanatory diagram showing the arrangement of a conventional pulse arc discharge welding apparatus which has been disclosed, for instance, in Published Unexamined Japanese Patent Application (OPI) No. 19177/1982.

In FIG. 6, reference numeral 1 designates a DC power source; 2, a switching element which comprises a power transistor element which turns on and off the output current of the DC power source 1, thus forming a pulse-shaped current waveform; that is, performing the chopper control of the current; and 3; an arc load section. The arc load section comprises: a welding torch 31, and a wire electrode 32 which is a filter metal in the form of a wire, and is supplied from a wire reel. Further in FIG. 6, reference numeral 4 designates an arc maintaining power source for supplying a continuous base current to the switching element 2 in order to prevent the difficulty that the discontinuation of arc occurs between the above-described pulses; 5, a control circuit for controlling the switching element 2, to set the pulse frequency and pulse width of the pulse current to predetermined values; and 6, a current detector for detecting the current i.

The operation of the pulse arc discharge welding apparatus thus organized will be described.

In general, in the pulse arc discharge welding apparatus, even in the case where the average current is smaller than that in a DC arc discharge welding apparatus, the end portion of the wire electrode 32 is melted with the pulse arc current, and the melted end portion, is disconnected from the wire electrode by the electromagnetic pinch force of pulse arc current, thus forming a molten drop, and the molten drops thus formed are intermittently transferred to the material 34 to be welded (hereinafter referred to as "a welding material 34", when applicable), thus achieving the welding. The transfer of the molten drop will be referred to as "a spray transfer", when applicable. Thus, the pulse arc discharge welding apparatus can perform a welding operation with an average current lower than that in the DC arc discharge welding apparatus. Therefore, the pulse arc discharge welding apparatus is advantageous in that a thinner spray transfer welding of a welding material can be achieved, and the spray transfer eliminates the "spattering" which otherwise may be caused during the welding operation.

The waveform of the pulse arc current employed in the pulse arc welding operation will be described. It has the following functions or characteristics:

FIGS. 7A and 7B show examples of the pulse arc current waveform. In this case, the material of the wire electrode is soft steel, the wire electrode is 1.2 mmΦ, and the atmospheric gas is a mixture of argon gas and 20% $CO_2$ gas.

The pulse arc current waveform is so determined that, in the case of a welding operation with a high average current, its pulse period $C_{B1}$ is short as shown in FIG. 7A, and in the case of a welding operation with a low average current, its pulse period $C_{B2}$ is long as shown in FIG. 7B.

FIG. 8 is a characteristic diagram indicating a relationship between pulse peak current values $I_P$ and molten droplet length λ which can leave the wire electrode having a diameter of 1.2 mm. In FIG. 8, the characteristic curve 16 shows pulse peak current values with molten droplet lengths λ with which such a molten droplet can leave the wire electrode in the case where the atmospheric gas is a mixture of argon gas and 20% $CO_2$ gas, and the characteristic curve 17 indicates pulse peak current values with such molten droplet lengths λ, in the case where the atmospheric gas is 100% $CO_2$ gas. When the arc length is above the one-dot chain line 20 in FIG. 8, then welding defects called "undercuts" π will be formed; that is, the one-dot chain line 20 is a threshold line. In the shaded region A of FIG. 8, a welding operation can be carried out without formation of undercuts or spatters. That is, the welding operation is satisfactorily achieved through the spray transfer of molten droplets.

In order to perform a pulse arc welding operation satisfactorily, it is essential to prevent the spattering of molten material during the welding operation to prevent the formation of undercuts which are defects formed in welding beads, and to make substantially unifar the size of molten droplets leaving the wire electrode. More specifically in order to prevent the spattering mentioned above, it is necessary to prevent the contact of the wire electrode and the object to be welded; and in order to prevent the formation of undercuts, it is essential to make the arc length short. In order to meet the two requirements at the same time, the pulverization (spray transfer) of the molten drop leaving the wire electrode is required. In order to make uniform the size of molten droplets leaving the wire electrode, a pulse arc current constant in waveform should be applied periodically as shown in FIGS. 7A and 7B.

In the atmospheric gas which is the mixture of argon gas and 20% $CO_2$ gas, the size of the molten drop which can leave the wire electrode depends on the pulse arc current peak value $I_P$ as indicated by the characteristic curve 16 in FIG. 8.

As is apparent from the characteristic curve 16 in FIG. 8, the length λ of the molten droplet leaving the wire electrode is reduced abruptly when the pulse peak current value $I_P$ is about 300 A, being 0.3 to 0.4 mm when it is 400 A. That is, even when the distance (arc length) between the wire electrode and the welding material is made as short as about 0.4 mm, then the molten metal can be left from the wire electrode with the pulse current; that is, the welding operation can be achieved satisfactorily.

In FIG. 8, the one-dot chain line is obtained through experiment, indicating the maximum arc length with which no undercuts are formed in the welding bead; that is, the welding bead formed is satisfactory in quality. Thus, it can be understood that, in order to prevent the formation of spatters during the welding operation and to obtain high quality welding beads with no undercuts, the pulse peak current value $I_P$ should be at least 300 A.

When, in the case where a pulse current waveform as shown in FIGS. 7A and 7B is employed and the atmospheric gas is a 100% $CO_2$ gas, the pulse peak current value $I_P$ is 450 A, the molten droplet will not leave the wire electrode having a diameter of 12 mm; and when the pulse peak current value $I_P$ is 500 A, the molten droplet will not leave the wire electrode, having a diameter of 8 mm. As a result undercuts occur in the welding bead. Accordingly, it is estimated that, when the molten droplet is allowed to leave the wire electrode in the atmospheric gas of 100% $CO_2$, the pulse peak current $I_P$ characteristic is such as indicated by the characteristic curve 17 in FIG. 8.

Phenomena as shown in FIGS. 9A and 9B have been found through observation of the leaving of molten droplets from the wire electrode with the pulse peak, current value $I_P$ set to 500 A. That is, when, as shown in FIG. 9A, the base current $I_B$ is high and the pulse width τ is short, the molten droplet 36 formed at the end of the wire electrode changes from $P_O$ to $P_{a1}$ in configuration, and finally to $P_{a2}$; that is, it cannot leave the wire electrode until it becomes bulky. On the other hand, when, as shown in FIG. 9B, the base current $I_B$ is low and the pulse width τ is long, the electromagnetic force F of the pulse current acts upwardly, and therefore the molten droplet 36 changes from $P_o$ to $P_{b2}$, in configuration, thus being raised, and then to $P_{b2}$, thus leaving the wire electrode. The molten droplet thus left may not be dropped onto the welding material; that is, it may be scattered as spatters being rotated at high speed, or it may stick on the wire electrode again as indicated at $P_{b2'}$, thus forming a larger mOlten droplet which falls onto the welding material.

As is apparent from the characteristic curve 17 in FIG. 8 and FIGS. 9A and 9B, when, in the case where the atmospheric gas is a 100% $CO_2$ gas, the pulse peak current value $I_P$ is of the order of 500 A, the arc discharge is insufficient in spread, and therefore it is impossible to make smaller the molten droplet transferring onto the welding material.

It can be considered from the characteristic curve 17 in FIG. 8 that, in the case of the 100% $CO_2$ atmospheric gas, the pulse peak current value $I_P$ should be at least 700 A in order to reduce the size of the molten droplet leaving the wire electrode and to obtain a welding bead fine in quality.

FIG. 10A shows a pulse current waveform, and FIG. 10B schematically shows the transfer of a molten droplet and the change of a molten pool at the time instants (A) through (H) of the waveform. As is seen from FIGS. 10A and 10B, the molten pool is oscillated by the pulse, thus contacting the wire electrode so that sometimes spatters are formed.

FIG. 11A shows a pulse current waveform also, and FIG. 11B schematically shows the transfer of a molten droplet and the change of a molten pool at the time instants A through E of the waveform. FIG. 11B shows the case where, when the droplet transfer, being delayed, occurs during the base period (the point D), the current in the base period is low, and therefore the arc is discontinued at the transfer of the droplet.

The function or performance of the conventional pulse arc discharge welding apparatus is as described above. Therefore, if, in a pulse arc welding operation with a 100% $CO_2$ atmospheric gas, the pulse peak current pulse $I_P$ set to a small value, then a droplet leaving the wire electrode unavoidably becomes bulky; that is, the droplet formed at the end of the wire electrode may contact the welding material. As a result, it may be scattered as spatters around the welding apparatus, or form welding bead defects, namely, undercuts. Furthermore, the conventional welding apparatus is disadvantageous in that, when the pulse peak current value $I_P$ is set to a high value, then the power source becomes bulky, and accordingly the apparatus is increased in weight as much, and increased greatly in manufacturing cost. In addition the conventional welding apparatus suffers from the following difficulties: As shown in FIG. 10B, the molten pool is vibrated by the pulse, thus contacting the wire electrode, as a result of which spatters are formed. As shown in FIG. 11B, the arc is discontinued at the transfer of a droplet from the wire electrode.

SUMMARY OF THE INVENTION

Accordingly, an object of this invention is to eliminate the above-described difficulties accompanying a conventional pulsed arc discharge apparatus so as to obtain desired welding conditions. An object of the invention is to provide a pulsed arc discharge apparatus in which, even when the welding torch changes its height, the variation of the arc length is prevented, and the sectional area of the weld penetration can be made substantially constant.

Another object of this invention is to provide a current waveform with which a molten droplet transferring onto a welding material can be made smaller in size and the transfer of a molten droplet from the wire electrode is regularly carried out.

Still another object of the invention is to provide a current waveform which contributes to the elimination of the difficulty that the molten pool is vibrated by the pulse, thus contacting the wire electrode.

Another object of the invention is to provide a current waveform which can achieve both of the first and second objects of the invention.

A further object of the invention is to provide a current waveform which can prevent the discontinuation of arc which may be caused by the pulses at the transfer of a droplet from the wire electrode.

The foregoing and other objects of the invention have been achieved by the provision of a pulsed arc discharge apparatus in which a base current having a substantially constant peak value and maintaining discharge arcs, and a pulse current having a substantially constant peak value and being superposed on the base current are supplied between a base material and a welding. According to the invention, the apparatus includes: a detector for detecting a variation in arc length from an arc voltage; and a control unit for controlling the effective current of a pulsed arc discharge while maintaining the average current value of the pulsed arc discharge according to an output of the detector.

In a pulse arc discharge welding apparatus according to a second aspect of this invention, each pulse current waveform is formed into a pulse current group (high frequency pulse current group) consisting of plural pulse currents having at least one kind of pulse width and at least one kind of pulse interval, and a continuous base current is superposed on the high frequency pulse current group occurring periodically (cf. FIGS. 5, and 18 through 25).

In a pulse arc discharge welding apparatus according to a third aspect of the invention, each pulse current waveform is formed into first and second pulse currents or pulse current groups within a predetermined period of time A, and with the first pulse current made smaller than the second pulse current a continuous base current is superposed on the first and second pulse currents occurring periodically in pair (cf. FIG. 7).

In a pulse arc discharge welding apparatus according to a fourth aspect of the invention, each pulse current waveform is formed into a pulse current group (high frequency pulse current group) consisting of plural pulse currents having at least one kind of pulse width and at least one kind of pulse interval, the high frequency pulse current group is increased in peak value with time over more than at least a predetermined period of time A and is terminated at the end of a predetermined period of time A or when the peak value reaches a predetermined value, and a continuous base current is superposed on the high frequency pulse current group occurring periodically (cf. FIG. 10, X).

In a pulse arc discharge welding appartus according to a fifth aspect of the invention, a third pulse or third high frequency pulse group follows the high frequency pulse current group in the discharge welding appartus according to the second aspect of the invention or the second pulse current in the welding machine according to the second aspect of the invention to form a discharge current waveform (cf. FIGS. 11, and 13 through 17).

As described above, in the pulse arc discharge welding apparatus according to the second aspect of the invention, the pulse current waveform is made of a plurality of pulse currents (high frequency pulse current group), and the high frequency pulse current group is allowed to periodically occur to form the discharge current waveform; that is, each pulse current in a conventional pulse arc discharge welding apparatus is divided into a plurality of pulse currents, as a result of which the electromagnetic force of pulse arc discharge acting upwardly on the wire electrode is made intermittent, so that the force of raising the molten droplet formed at the end of the wire electrode is reduced. Therefore, the molten droplet formed at the end of the wire electrode will fall before becoming bulky.

In the pulse arc discharge welding apparatus according to the third aspect of the invention, as shown in FIG. 4, the pulse current waveform is such that the first and second pulse currents occur at intervals of less than the predetermined period of time A (7 ms for instance), so that the amplitude of the vibration of the molten pool which may be caused by the preceding pulse is reduced by the first pulse current, and therefore the molten pool does not contact the wire electrode when vibrated by the second pulse current transferring the molten droplet.

In a pulse arc discharge welding apparatus according to the fourth aspect of the invention, the pulse current waveform is made up of a plurality of pulse currents (high frequency pulse current group), in such a manner that the pulse currents are gradually increased over at least a predetermined period of time A, and the high frequency pulse current group is terminated at the end of a predetermined period of time B or when its peak value reaches a predetermined value, and the high frequency pulse current group is allowed to occur periodically thus forming the discharge current waveform. Therefore, the first half of the high frequency pulse current group reduces the amplitude of the vibration of the molten pool, thereby to prevent the contact of the molten pool with the wire electrode which otherwise may be caused by the vibration of the molten pool, and the electromagnetic force of pulse arc discharge acting upwardly on the end of the wire electrode is made intermittent; that is, the force of raising the molten droplet formed at the end of the wire electrode is reduced. Furthermore, with the second half of the high frequency pulse current group, the transfer of the molten droplets is conducted with high regularity.

In the pulse arc discharge welding apparatus according to the fifth aspect of the invention, the third pulse or third high frequency pulse group follows the high frequency pulse group in the discharge welding apparatus according to the first or second aspect of the invention or the second pulse current in the discharge welding apparatus according to the second aspect of the invention. The third pulse or third high frequency pulse group prevents the discontinuation of arc which may occur during the base period with the transfer of molten droplets delayed.

BRIEF DESCRIPTION OF THE DRAWINGS

In the accompanying drawings:

FIG. 4 is an explanatory diagram showing a pulsed arc forming region for a description of Joule heating and arc heating.

FIGS. 5A and 5B are explanatory diagrams, showing the sections of weld beads formed by the conventional pulsed arc discharge apparatus.

FIG. 8 is a graphical representation indicating pulse peak current values with lengths of molten droplets leaving the wire electrode through pulse arc discharge in the conventional pulse arc discharge welding apparatus.

FIG. 20 is a graphical representation showing pulse peak regions allowing a molten droplet to leave the wire electrode with pulse arc discharge in the discharge welding apparatus according to the first aspect of the invention.

FIGS. 24A, 24B, 25A, 25B, and 26 are block diagrams showing pulse arc current waveform forming circuits for the discharge welding apparatus according to the second aspect of the invention.

FIG. 28A, 28B are time charts for a description of the operation of the circuit shown in FIG. 27.

FIG. 29B is a time chart showing a pulse arc current waveform provided by the circuit of FIG. 29A.

DESCRIPTION OF THE PREFFERRED EMBODIMENTS

Figure 12:
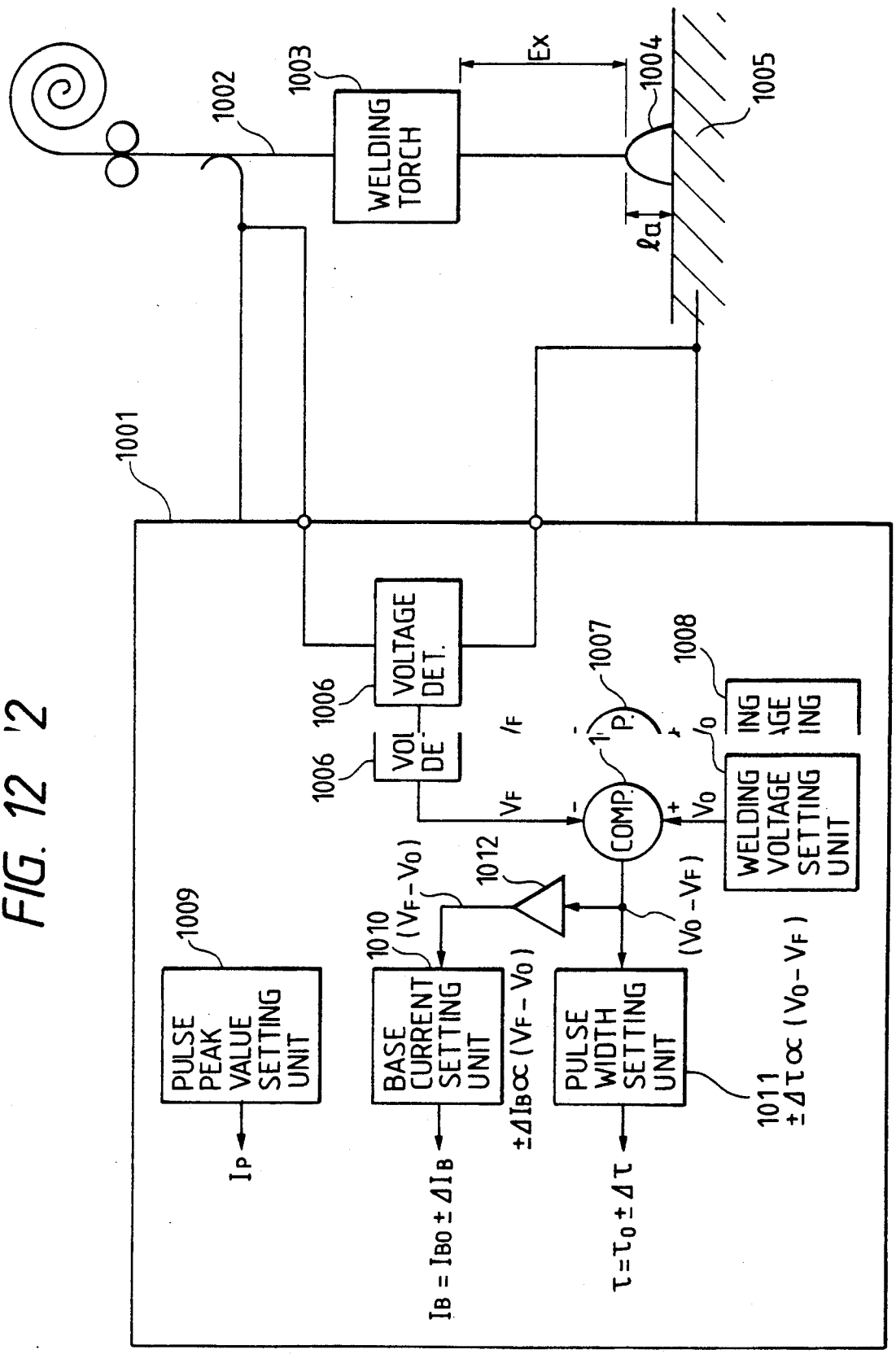
FIG. 12 is an explanatory diagram, partly as a block diagram, showing the arrangement of a first example of a pulsed arc discharge apparatus according to this invention.

FIG. 12 shows one embodiment of this invention. In FIG. 12, parts corresponding functionally to those already described with reference to FIGS. 1 through 5B are therefore designated by the same reference numerals or characters. In FIG. 12, reference numeral 1012 designates an inverter circuit for inverting signals. The difference voltage $(V_O - V_F)$ is applied to the pulse width setting unit 11 and to the inverter circuit 1012, the output $(V_F - V_O)$ of which is applied to the base current setting unit 1010.

Figure 13:
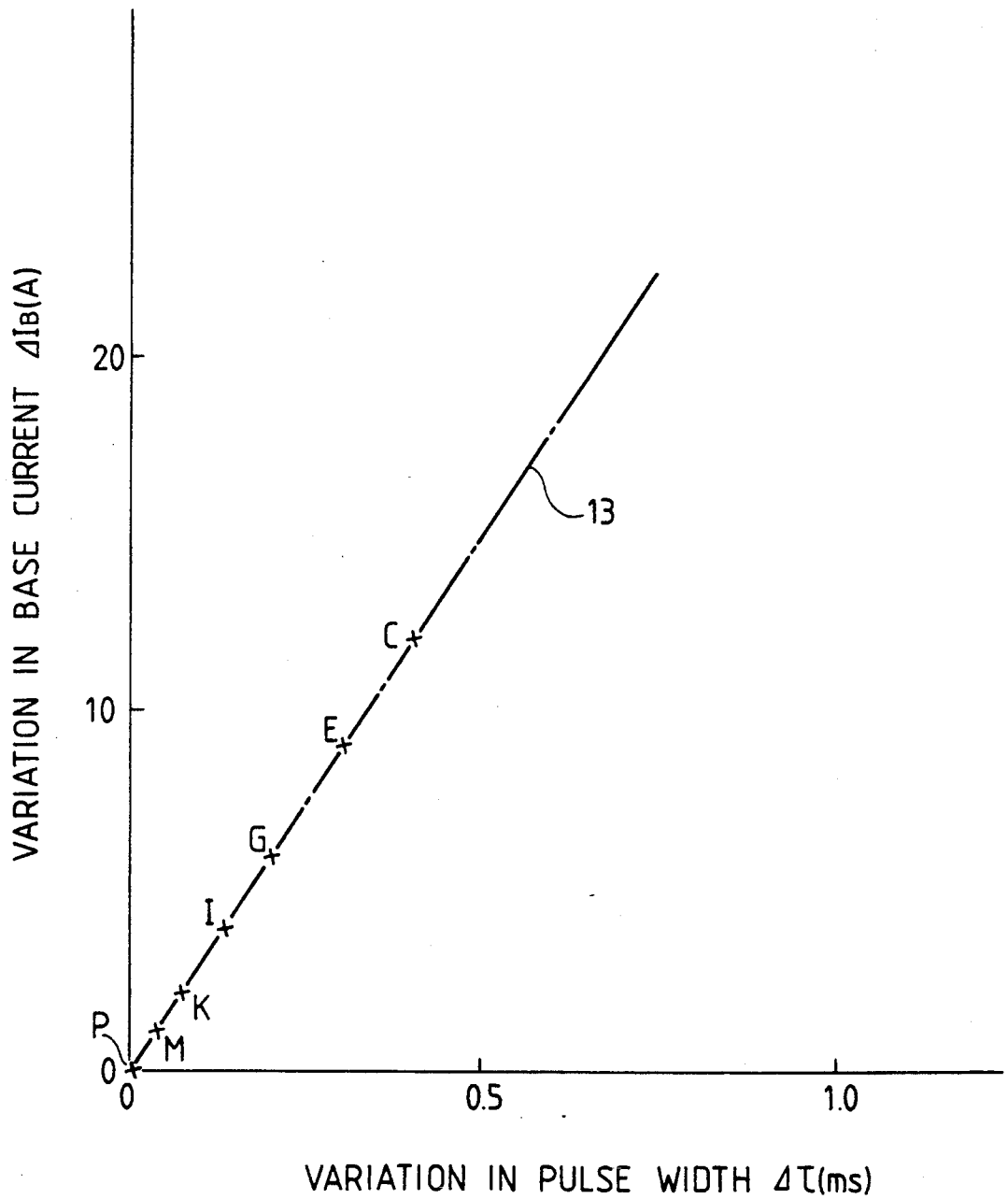
FIG. 13 is a graphical representation indicating pulse width variation with base current variation.

FIG. 13 is a graphical representation indicating pulse width variation $(\Delta\tau)$ with base current variation $(\Delta I_B)$ in the first embodiment shown in FIG. 12. In FIG. 13, reference numeral 13 designates a characteristic line in the embodiment.

Figure 14:
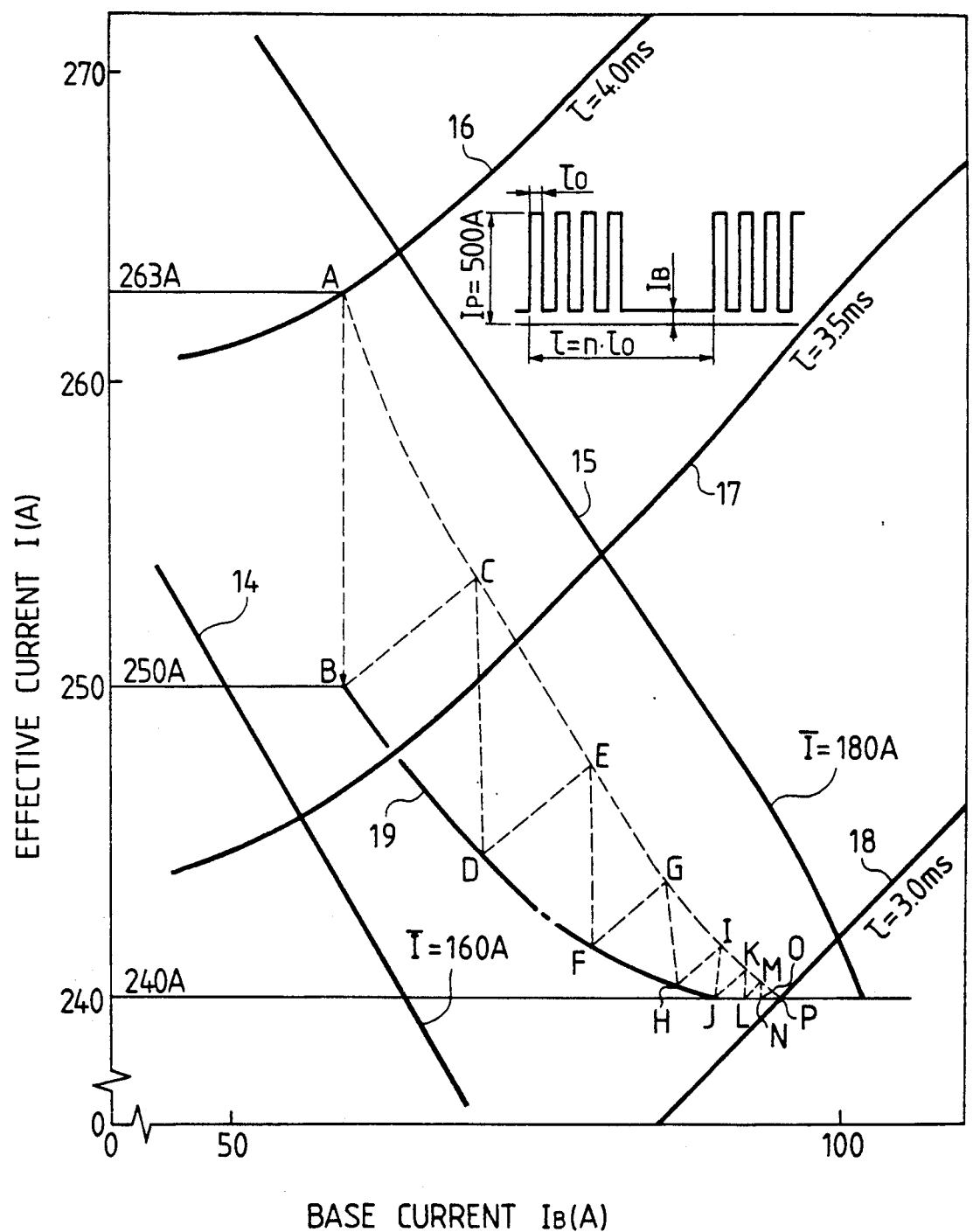
FIG. 14 is a graphical representation indicating base current versus effective current characteristics, and a transient characteristic in an arc length control according to the invention.

FIG. 14 is a graphical representation indicating base current $(I_B)$ versus effective current $(\bar{I})$ characteristics in the case where the pulse peak value $I_P$ is 500A, the pulse period is 15 ms, and the average current $\bar{I}$ or pulse width $\tau$ is held constant, and transient conditions in the case where the arc length control is carried out. In FIG. 14, reference numeral 14 designates a base current versus effective current characteristic with an average current $\bar{I}$ of 160A; and 15, a base current versus effective current characteristic with an average current $\bar{I}$ of 180A. Further in FIG. 14, reference numeral 16 designates an effective current characteristic with a pulse width $\tau$ of 4 ms; 17, an effective current characteristic with a pulse width of 3.5 ms; and 18, an effective current characteristic with a pulse width of 3 ms. Furthermore, in FIG. 14, reference numeral 19 designates a phantom line with $V_F = V_O$; and the broken line A→B→C→D÷E→F→G→H→I→J→K→L→M→N→ O→P→ represents the transient characteristic in the arc length control from state A to state P.

Figure 15A:
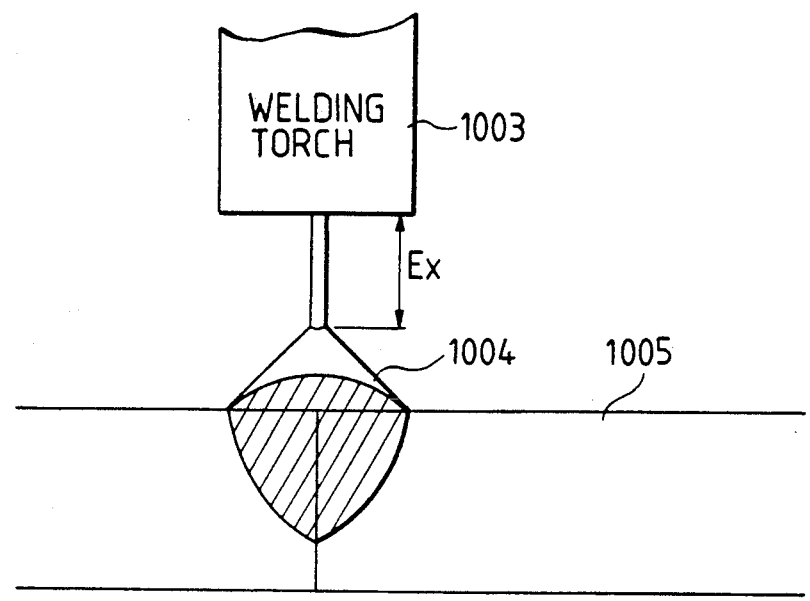
FIGS. 15A and 15B are explanatory diagrams showing the sections of weld beads formed according to the invention.
Figure 15B:
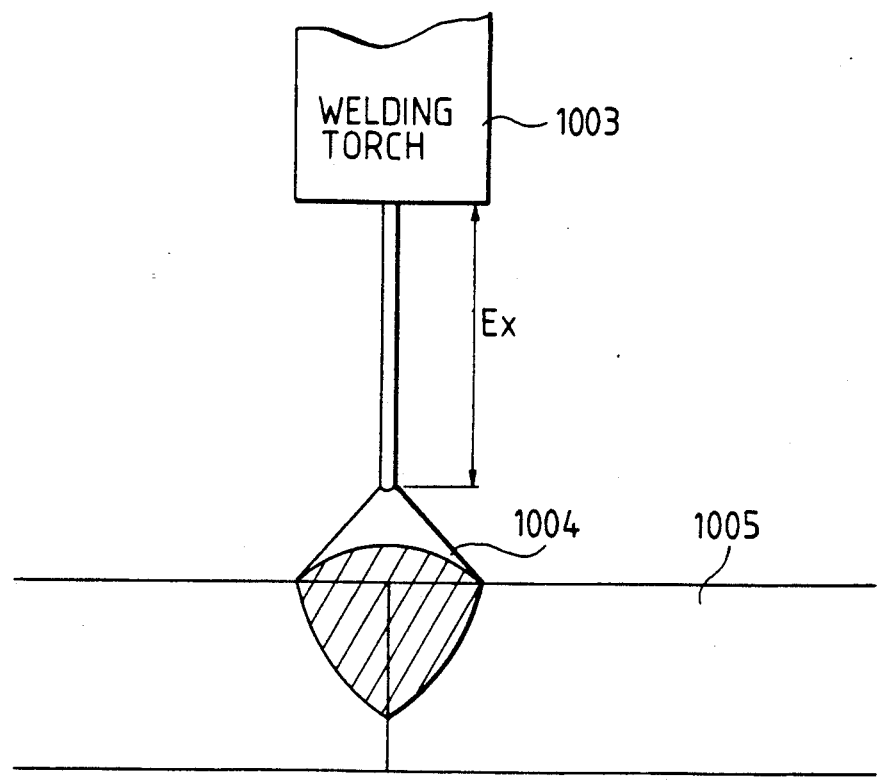

FIGS. 15A and 15B show the sections of the weld beads formed with the data at the above-described points A and P, respectively.

Let us consider the case where, in the abovedescribed pulsed arc discharge apparatus, the height of the welding torch 1003 changes, so that the length of extension Ex of the welding wire 1002 is changed from 15.8 mm to 20.4 mm. The case of Ex=15.8 mm corresponds to the point A in FIG. 14, and in this case, the effective current $\bar{I}$ is 263A, the pulse width $\tau$ is 4 ms, and the average current $\bar{I}$ is 177A.

When the length of extension Ex of the welding wire 1002 is changed to 20.4 mm, then the voltage $V_F$ across the welding torch 1003 and the base metal 1005 becomes higher than the welding voltage $V_O$, and the pulse width $\tau$ is decreased to 3.6 ms (point B) as the difference voltage $(V_O - V_F)$ is applied to the pulse width setting unit 1011. At the same time, the inversion signal $(V_F - V_O)$ of the difference voltage is applied to the base current setting unit 1010, so that the base current $I_B$ is raised to 72A (point C). As a result, the voltage $V_F$ becomes higher than the welding voltage $V_O$, and the pulse with $\tau$ is decreased to 3.3 ms (point D). When the pulse width variation $\Delta\tau$ is decreased to 0.3 ms, the base current $I_B$ is increased to 81A (point E). When the base current $I_B$ reaches 81A in this manner, the voltage $V_F$ becomes higher than the welding voltage $V_O$, and the pulse width $\tau$ is further decreased to 3.1 ms (point F). When the pulse width variation $\Delta\tau$ is decreased to 0.2 ms, the base current $I_B$ is increased to 87A. Thus, the decrease of the pulse width $\tau$ and the increase of the base current $I_B$ are repeatedly carried out in the above-described manner, thus converging at the point P. That is, at the point P, the pulse width $\tau$ is 3 ms, the effective current $\dot{I}$ is 240A, and the average current $\bar{I}$ is 177A.

The transition $(A \to B \to C \to D \to E \to F \to G \to H \to I \to J \to K \to L \to M \to N \to O \to P \to)$ of the electrical data in the case where the length of extension of the welding wire is changed from 15.8 mm to 20.4 mm) has been described for every point in the stated order; however, it should be noted that the electrical data at the point A are quickly changed into those at the point P. In the above-described embodiment, the length of extension Ex is increased. In the case where, in contrast, the length of extension Ex is decreased, the transition of the electrical data is carried out in the reverse order; that is, the electrical data at the point P are quickly changed to those at the point A.

Figure 16:
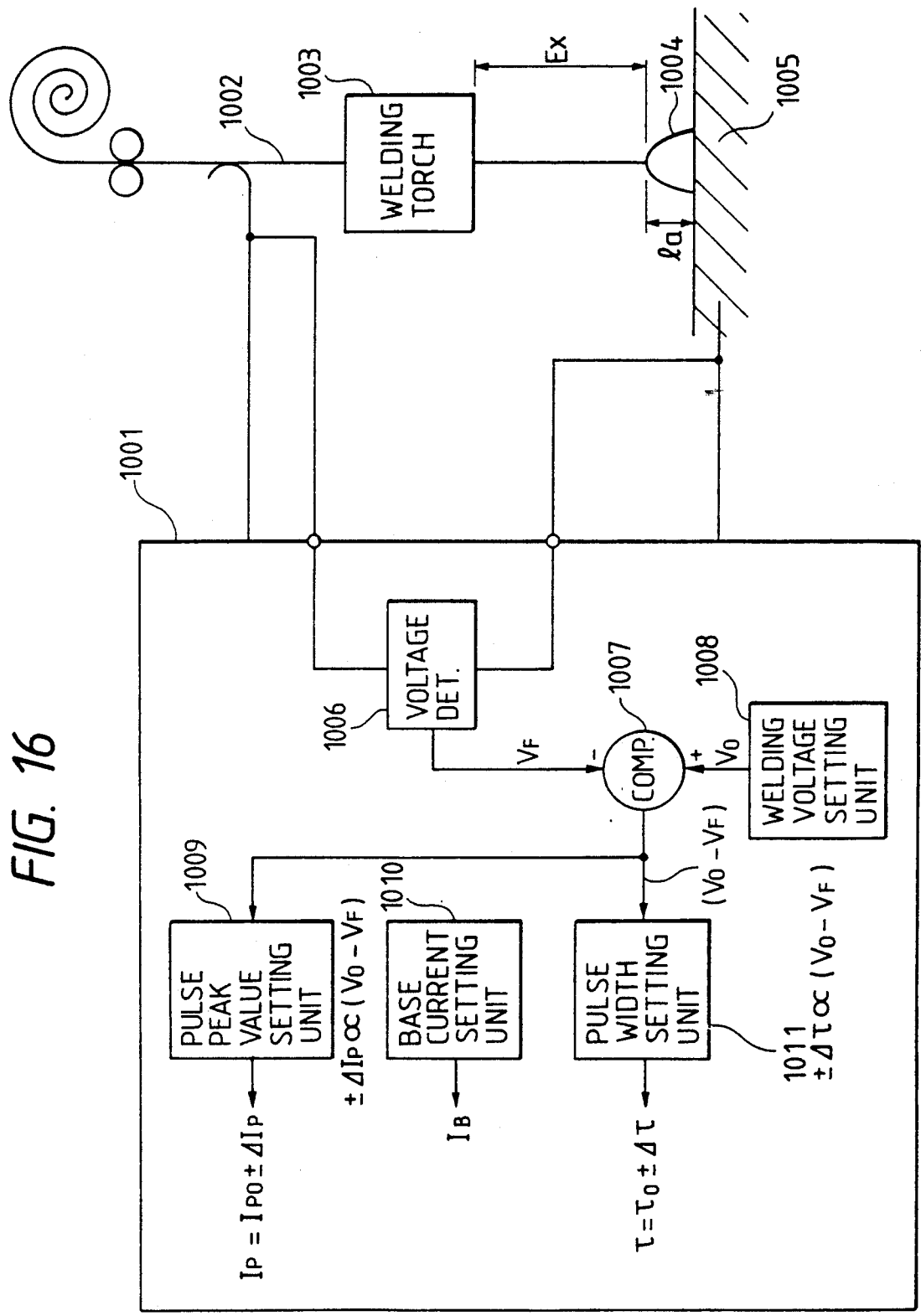
FIG. 16 is an explanatory diagram, partly as a block diagram showing another example of the pulsed arc discharge apparatus according to the invention.

In the above-described embodiment, the inversion signal $(V_F - V_O)$ of the difference voltage $(V_O - V_F)$ is applied to the base current setting unit 1010. However, the same effect can be obtained by modifying the apparatus as follows: As shown in FIG. 16, the difference voltage $(V_O - V_F)$ is applied to the pulse peak value setting unit 1009 so as to control the pulse peak current value.

Furthermore, in the above-described embodiment, the difference voltage $(V_O - V_F)$ is applied to the pulse width setting unit 1011 to control the pulse width $\tau$. However, the same effect can be obtained by controlling the pulse frequency instead of the pulse width $\tau$.

Figure 17:
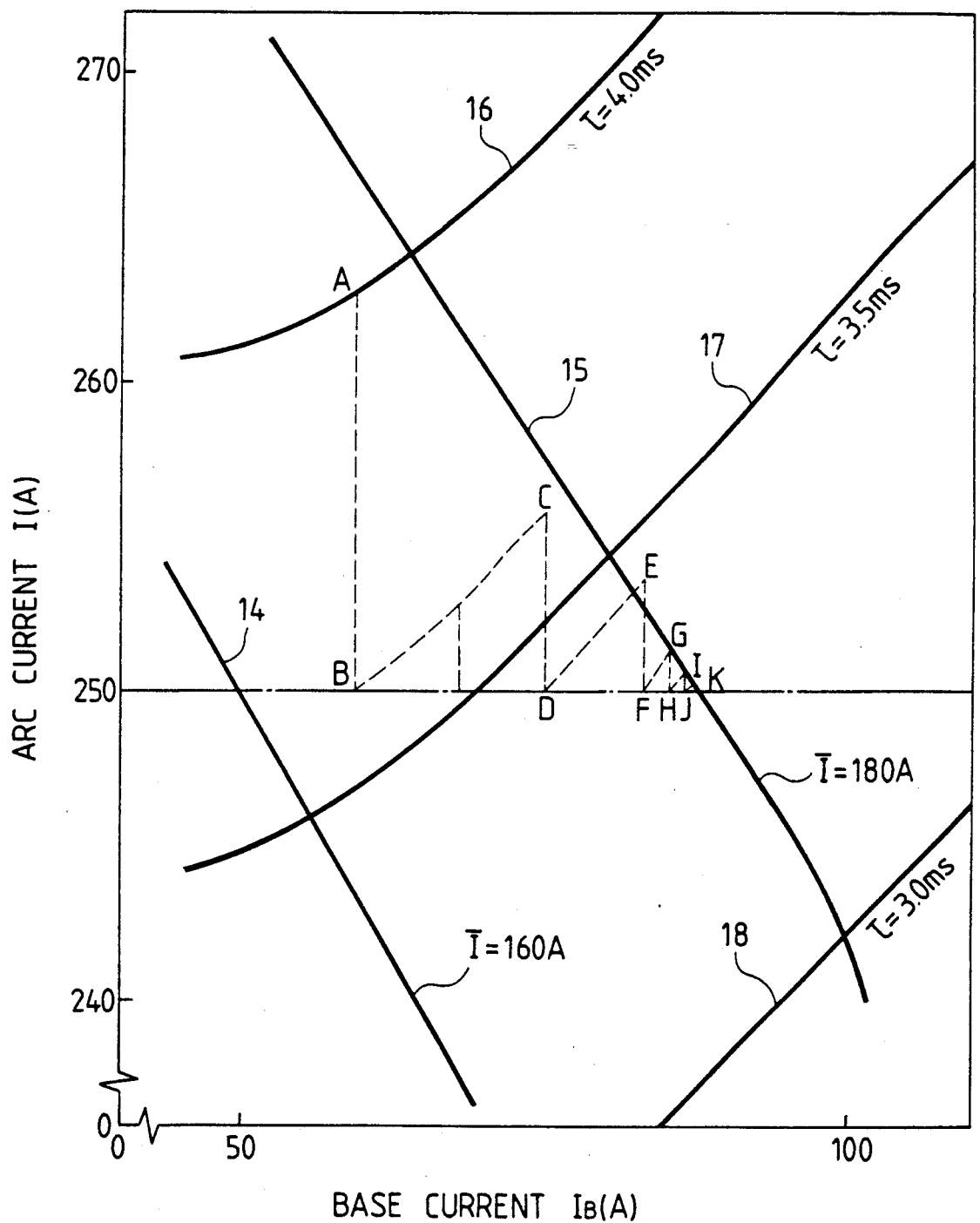
FIG. 17 is a graphical representation (corresponding to FIG. 3) for a description of one application of the invention in control.

In the above-described embodiment, the electrical data are changed from those at the point A to those at the point P according to the difference voltage $(V_O - V_F)$. If, in addition to the difference voltage, the effective value at the point B is detected in a sampling mode, and the value thus detected is held unchanged so that, as shown in FIG. 17, the electrical data are changed from those at the point A to those at the point K, then instead of the arc length $\lambda a$, the arc load can be maintained constant.

In the pulsed arc discharge apparatus according to the invention, its control unit may comprise means for controlling the pulse width or pulse frequency according to the variation of the arc voltage, to increase or decrease the base current value, or means for controlling the pulse width or pulse frequency according to the variation of the arc voltage, to control the pulse peak current value.

As was described above, in the pulsed arc discharge apparatus according to the invention, the effective current of the pulse arc discharge is controlled with the average current of the pulse arc discharge maintained substantially constant. Therefore, even when the height of the welding torch changes, the variation of the arc length can be prevented, and the resultant weld penetration is substantially constant in sectional area. Thus, the pulsed arc discharge apparatus of the invention is high in reliability, and allows a welding operation with high accuracy.

Furthermore, in the apparatus of the invention, its control unit comprises the means for controlling the base current value according to the variation of the arc voltage or the means for controlling the pulse peak current value according to the variation of the arc voltage. Therefore, the pulsed arc discharge apparatus of the invention can be formed by slightly modifying the conventional pulsed arc discharge apparatus.

Preferred embodiments of this invention will be described with reference to the accompanying drawings.

Figure 18:
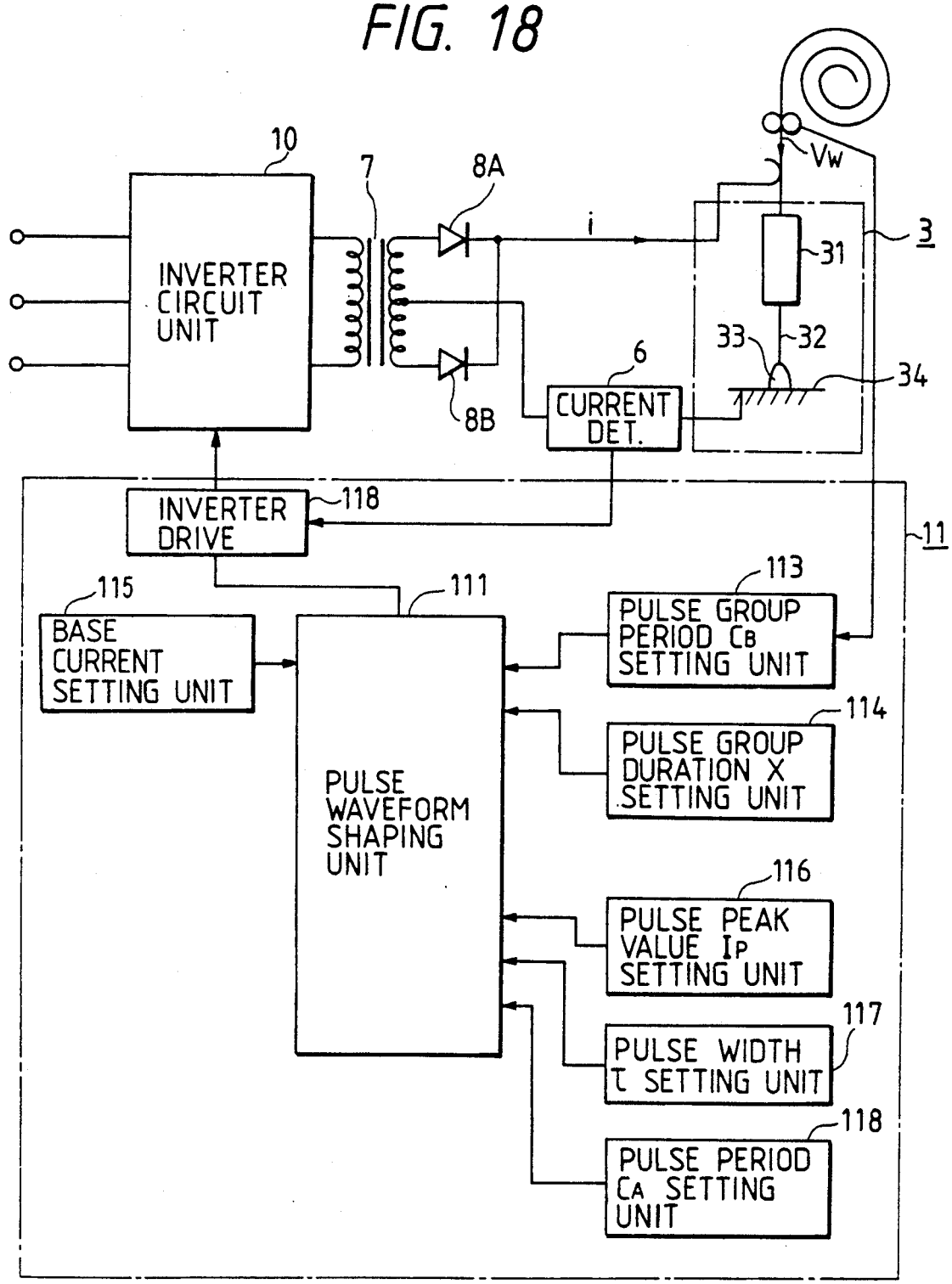
FIG. 18 is a circuit diagram, partly as a block diagram, showing the arrangement of a pulse arc discharge welding apparatus which is in common with first through fourth aspects of this invention.

FIG. 18 is a circuit diagram showing the arrangement of a pulse arc discharge welding apparatus, which is in common with first through fourth aspects of the invention. In FIG. 18, reference numeral 10 designates an inverter circuit section which has the same function as the switching element 2 in FIG. 6 and can be controlled with higher accuracy and 11, a pulse current waveform control circuit for shaping a pulse current waveform and driving the inverter circuit section 10.

The pulse current waveform control circuit 11 comprises: a pulse waveform shaping unit 111; a pulse group period $C_B$ setting unit 113; a pulse group duration X setting unit 114; a base current $I_B$ setting unit 115; a pulse peak value $I_P$ setting unit 116; a pulse width setting unit 117; and a pulse period $C_A$ setting unit 118.

Figure 1:
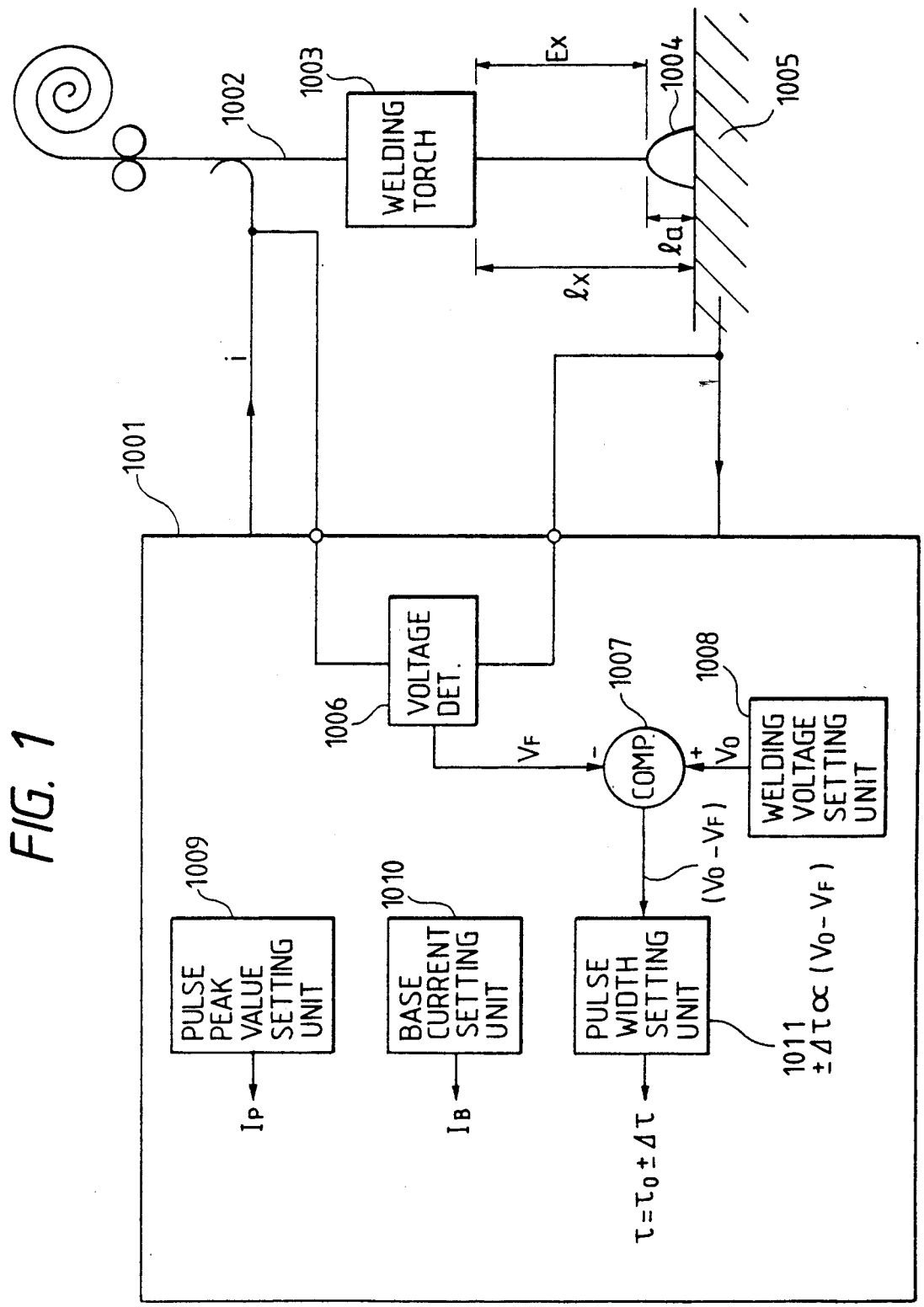
FIG. 1 is an explanatory diagram, partly as a block diagram (corresponding to FIG. 1) showing a conventional pulsed arc discharge apparatus.
Figure 3:
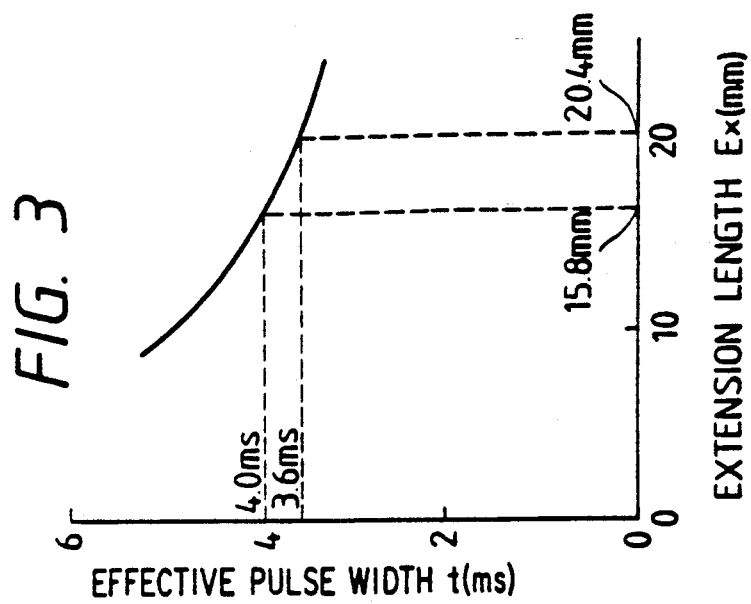
FIG. 3 is a graphical representation indicating a length-of-extension versus pulse-width characteristic of the conventional pulsed arc discharge apparatus.
Figure 2A:
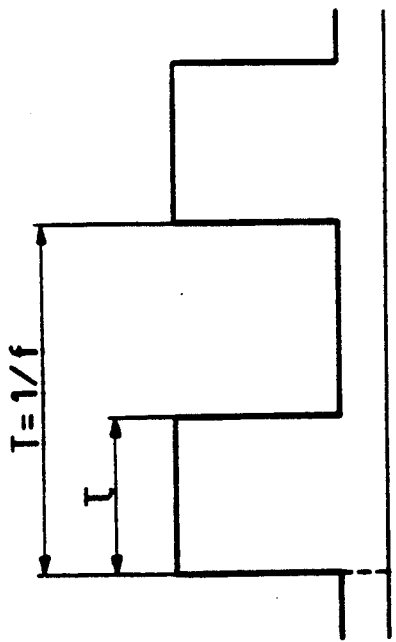
FIGS. 2A and 2B are waveform diagrams showing examples of a pulsed arc current waveform.
Figure 2B:
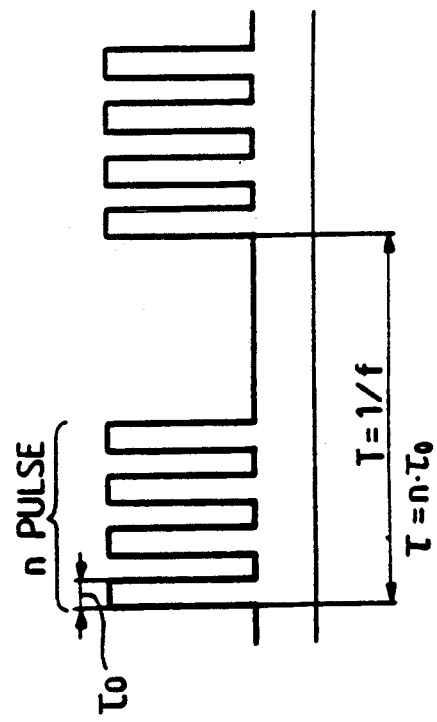
Figure 6:
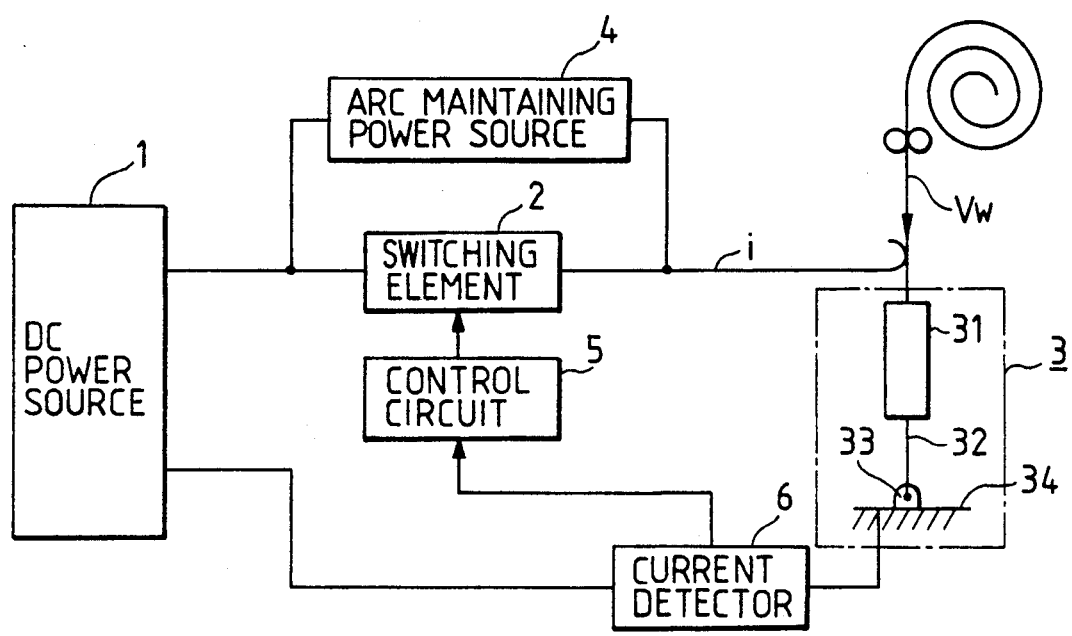
FIG. 6 is an explanatory diagram, partly as a block diagram, showing the arrangement of a conventional pulse arc discharge welding apparatus.

Further in FIG. 18, reference numeral 7 designates a high frequency transformer; and $8_A$ and $8_B$, high frequency diodes for rectifying the output waveform of the high frequency transformer 7. In FIG. 18, parts corresponding functionally to those which have been already described with reference to FIG. 6 are therefore designated by the same reference numerals or characters.

Figure 19:
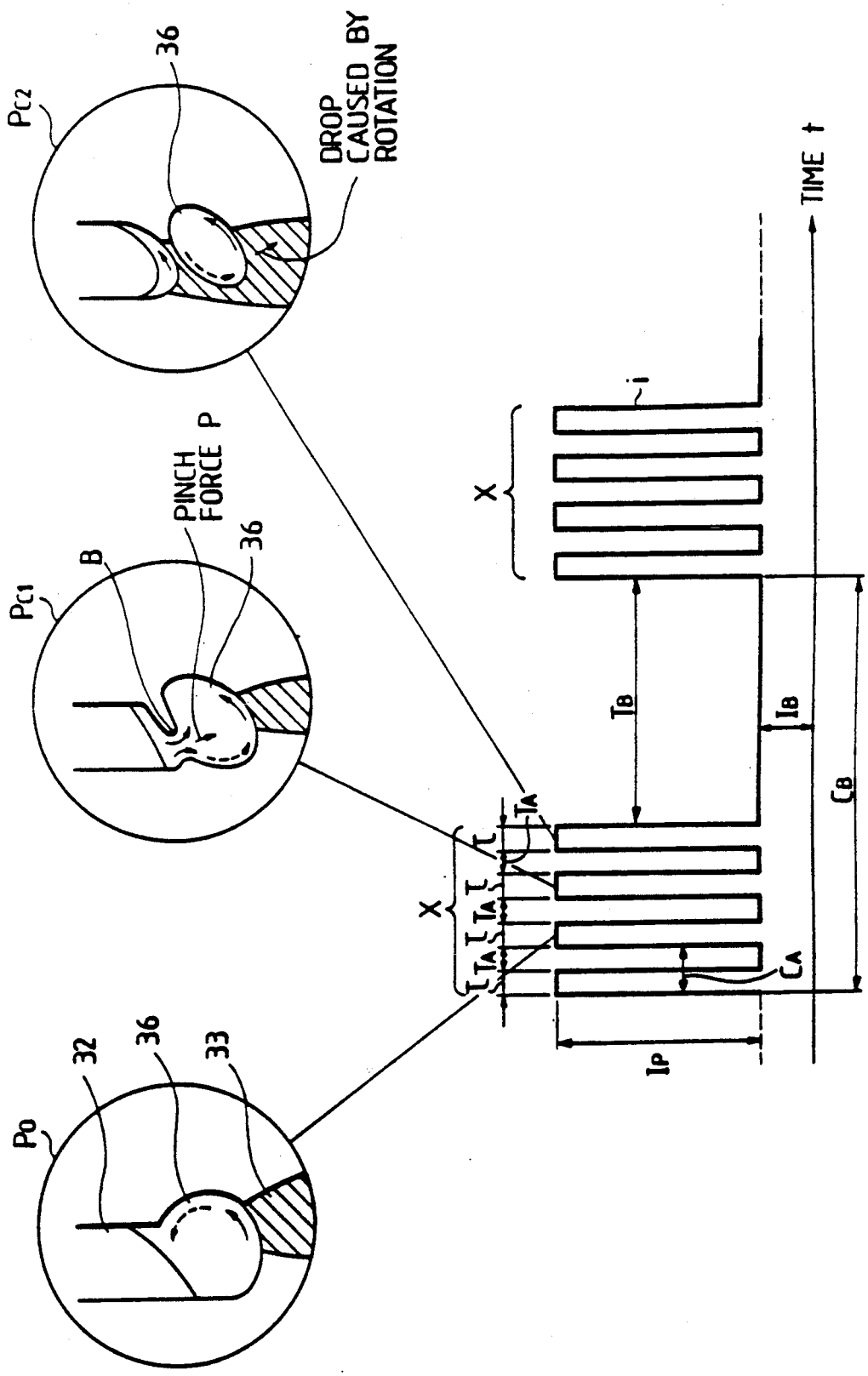
FIG. 19 is an explanatory diagram showing a pulse arc discharge current waveform and the transfer of a molten droplet in the pulse arc discharge welding apparatus according to the first aspect of the invention.
Figures 21A, 21B:
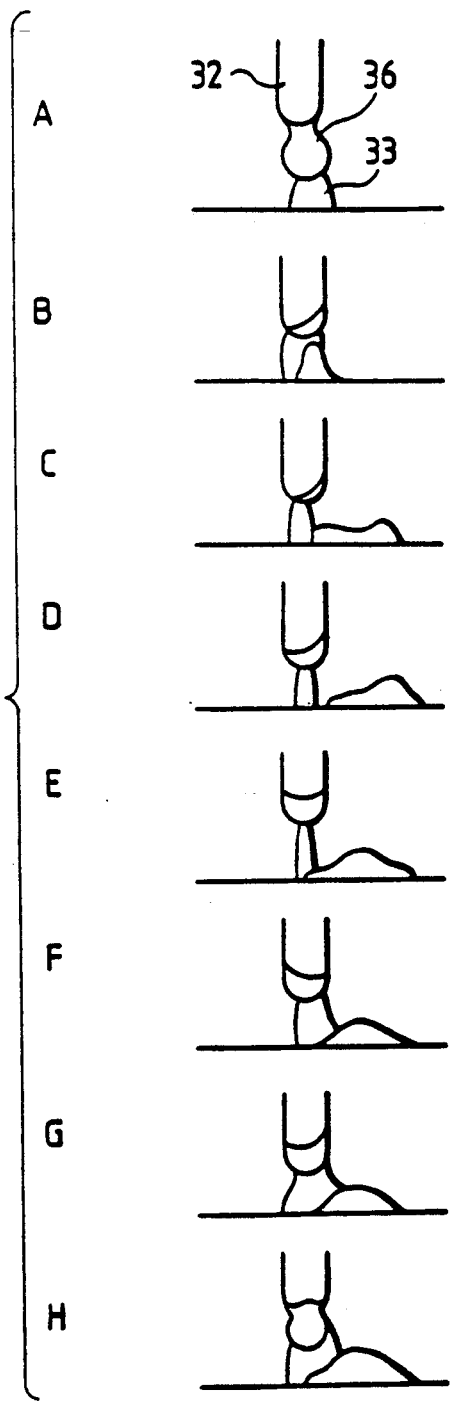
FIG. 21A and 21B are explanatory diagrams showing a pulse arc discharge current waveform and the vibration of a molten pool in the pulse arc discharge welding apparatus according to the second aspect of the invention.

FIG. 19 is an explanatory diagram showing one example of a pulse arc current waveform i according to the first aspect of the invention, and the transfer of a molten droplet in the case where a welding operation is carried out with that waveform. In FIG. 19, the pulse peak current value is represented by $I_P$, the pulse width by $\tau$, the pulse interval in a pulse current group X by $T_A$, the repetitive period of the pulse current by $C_A$, the base current value by $I_B$, the repetitive interval of the pulse current group X by $T_B$, and the repetitive period of the pulse current group X by $C_B$.

Figure 22:
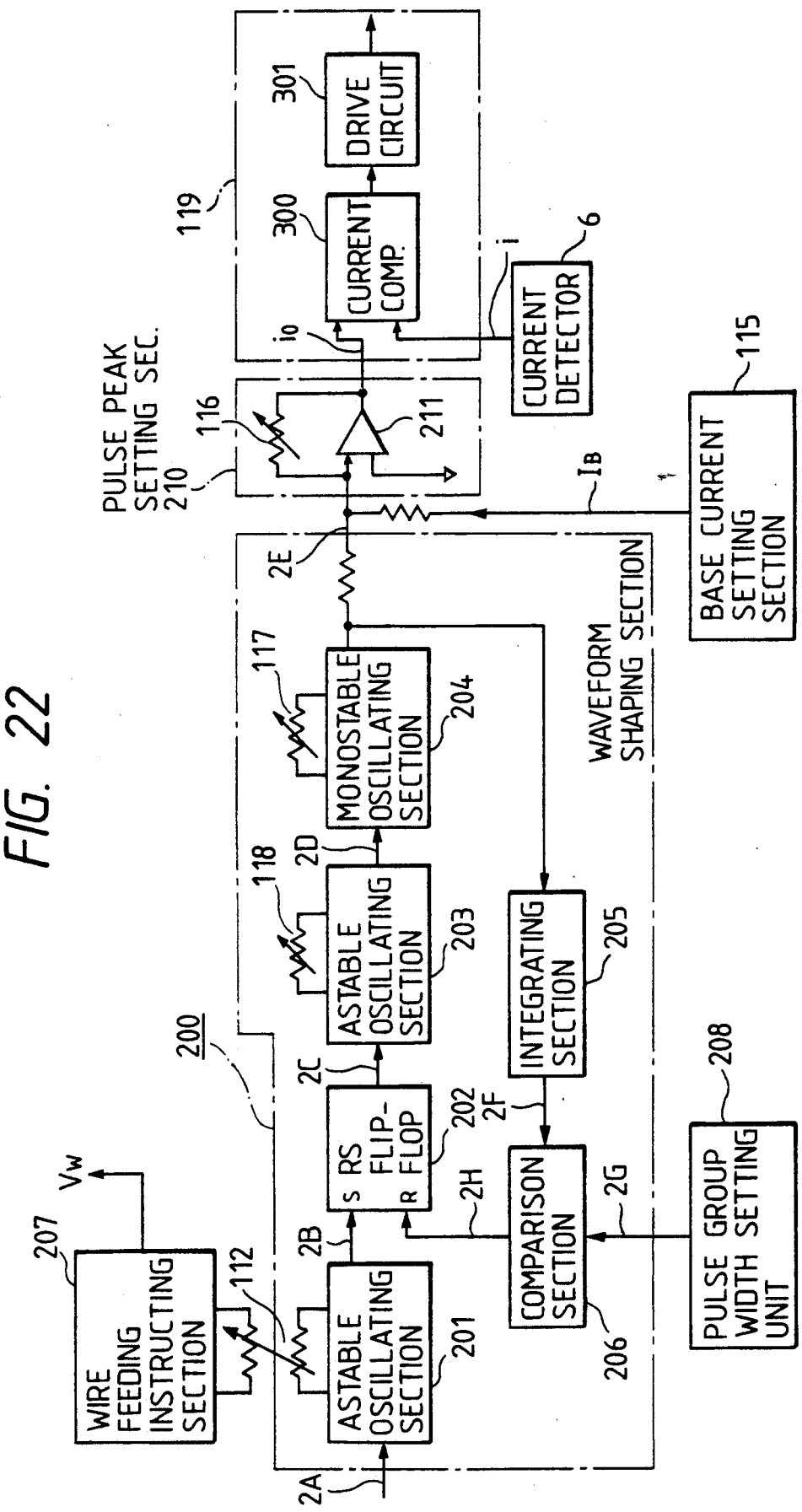
FIG. 22 is a block diagram showing the arrangement of a pulse arc current waveform shaping circuit in the discharge welding apparatus according to the second aspect of the invention.

FIG. 22 is a block diagram showing the arrangement of a pulse current waveform control circuit 11 for shaping a pulse arc current waveform according to the first aspect of the invention.

Figure 24A:
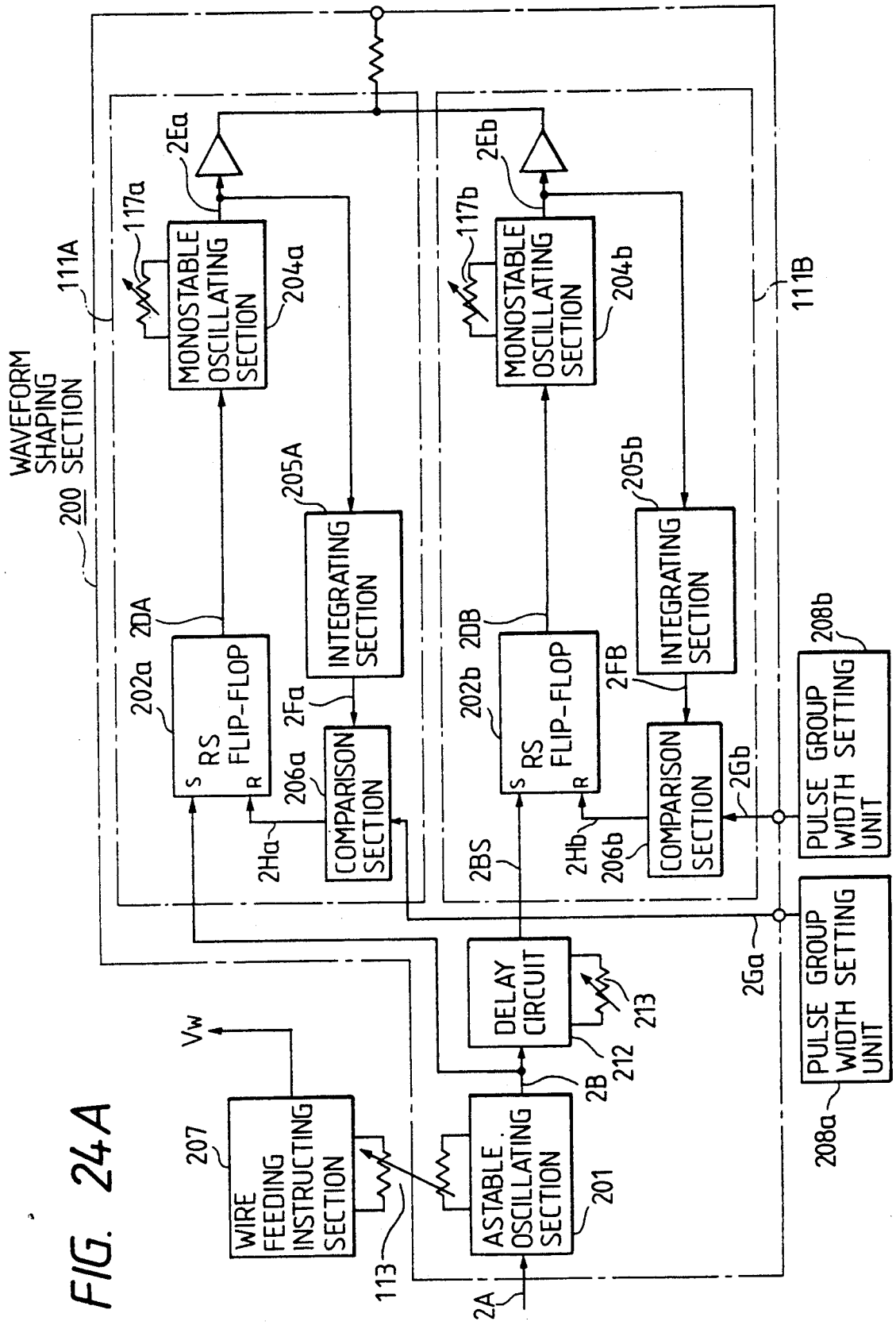
Figure 25B:
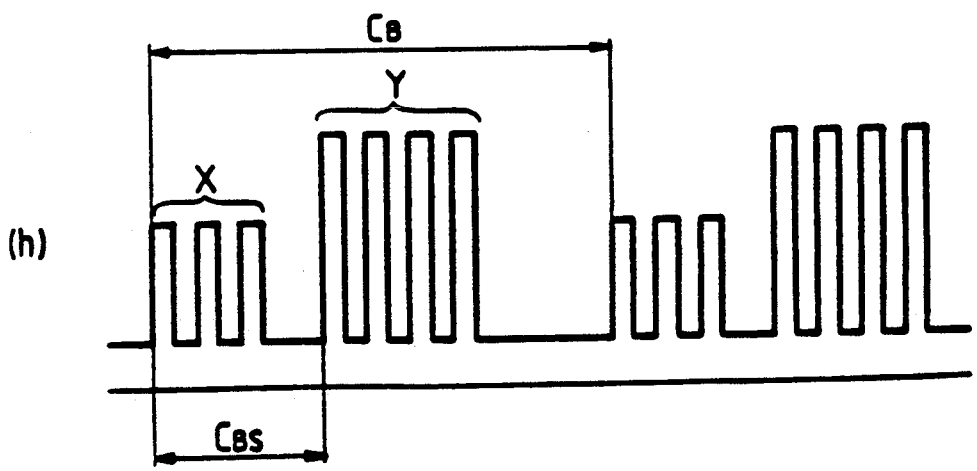
Figure 25A:
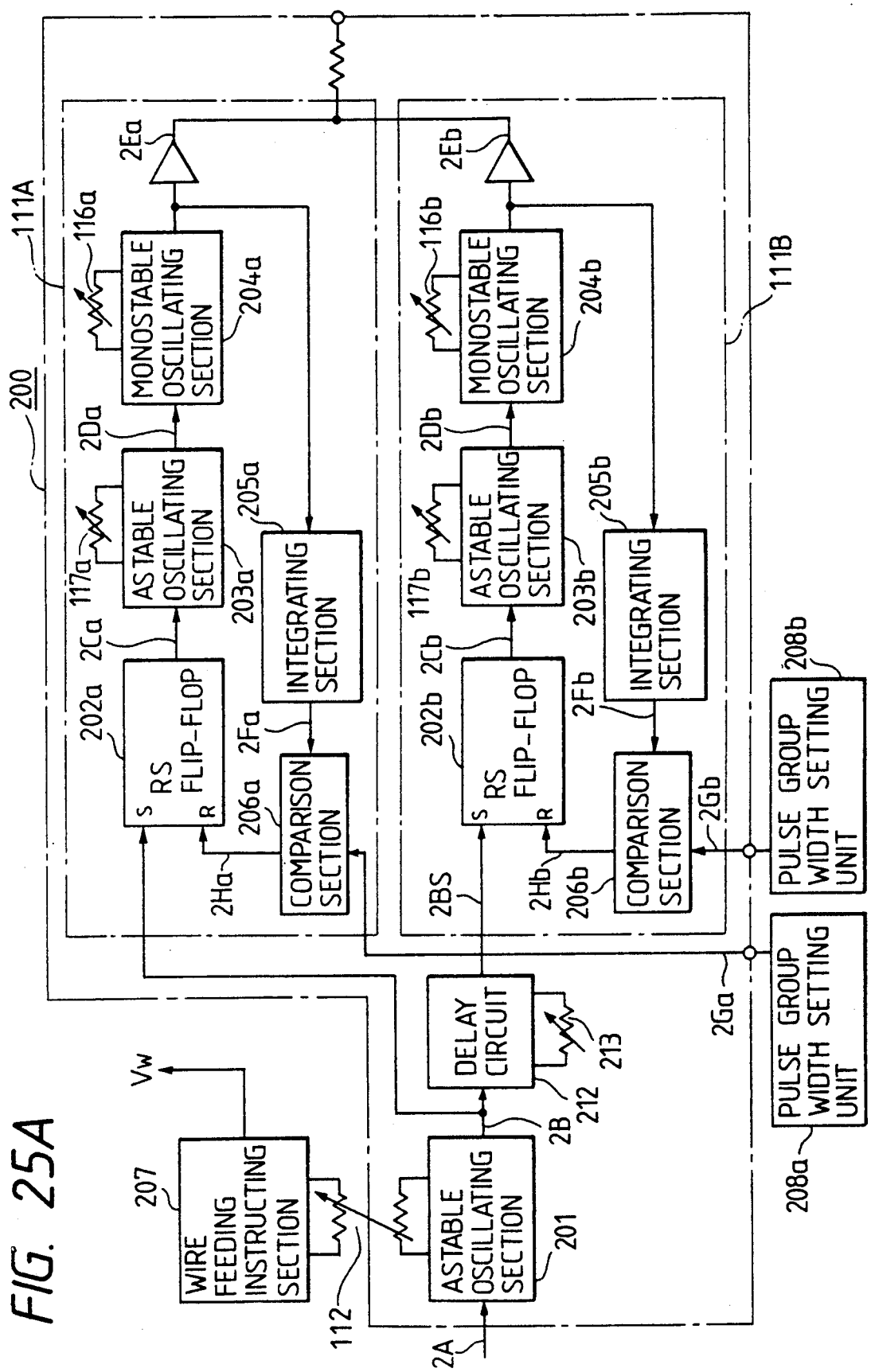

FIGS. 24A and 25A are block diagrams showing the arrangement of a pulse current waveform control circuit 11 for shaping a pulse arc current waveform according to the second aspect of the invention.

Figure 27:
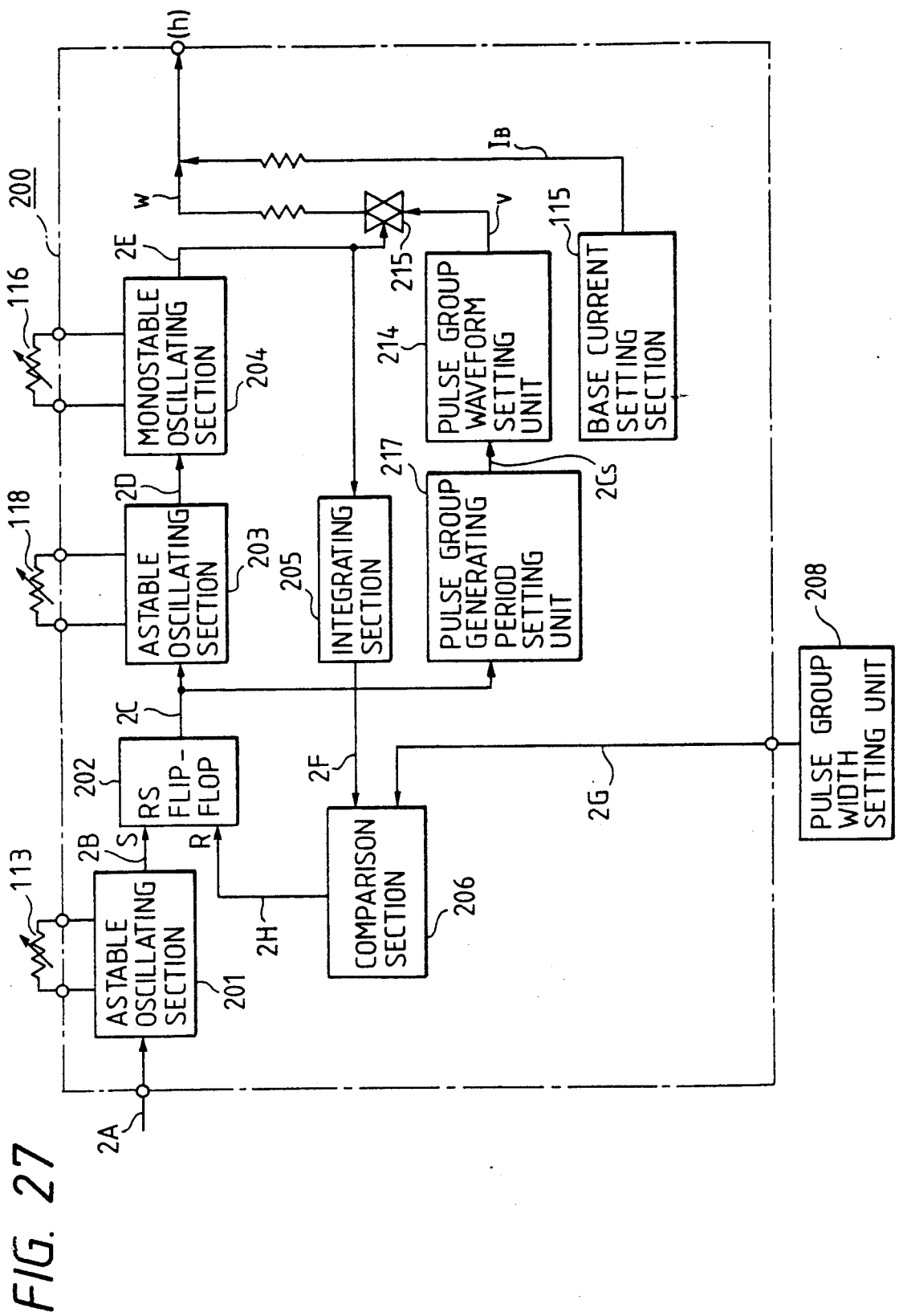
FIG. 27 is a block diagram showing a pulse arc current waveform forming circuit for the discharge welding apparatus according to the third aspect of the invention.

FIG. 27 is a block diagram showing the arrangement of a pulse current waveform control circuit 11 for shaping a pulse arc current waveform according to the third aspect of the invention.

Figure 29A:
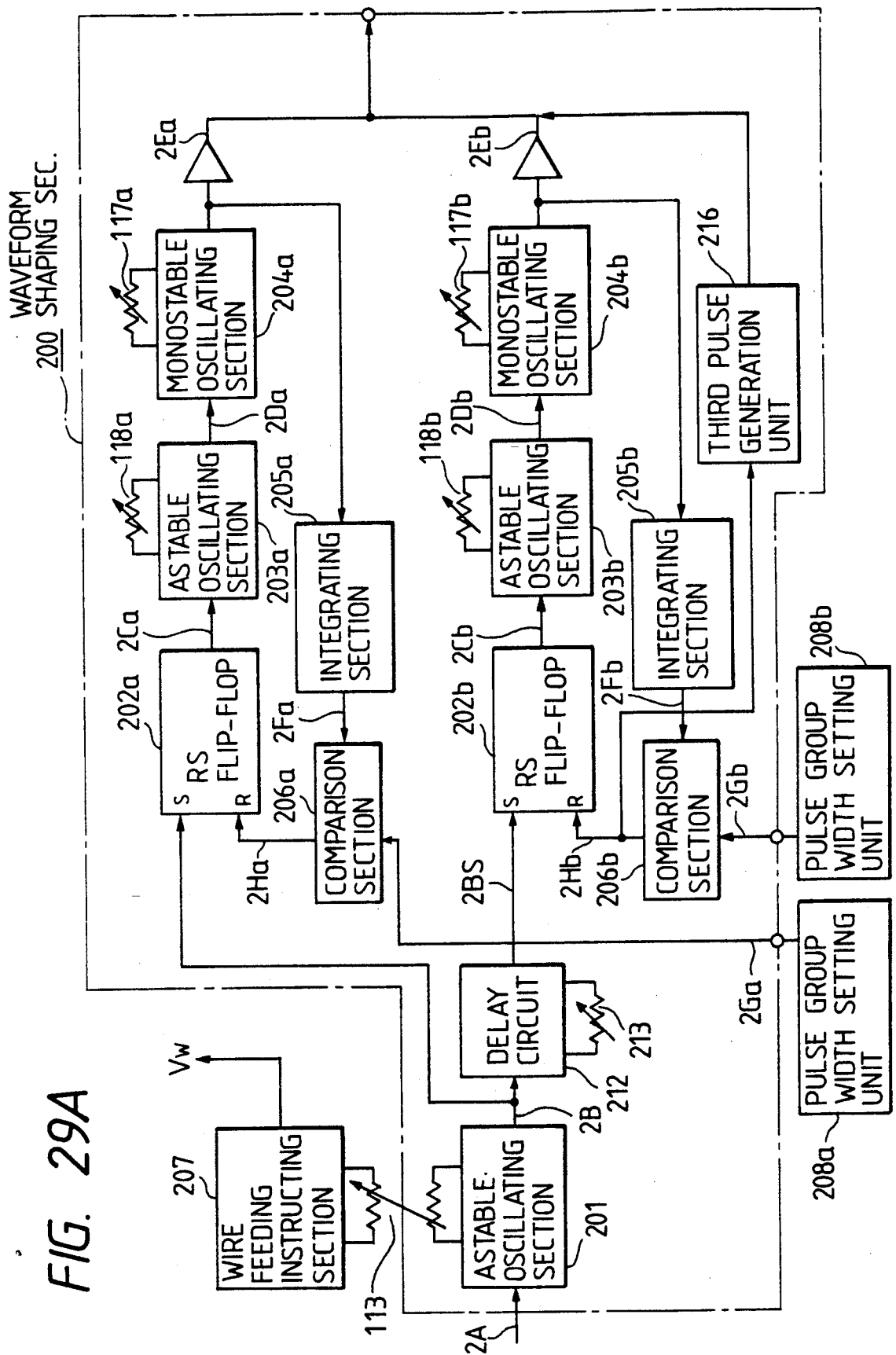
FIGS. 29A, 29B and 30 are block diagrams showing pulse arc current waveform forming circuits for the discharge welding apparatus according to the fourth aspect of the invention.
Figure 30:
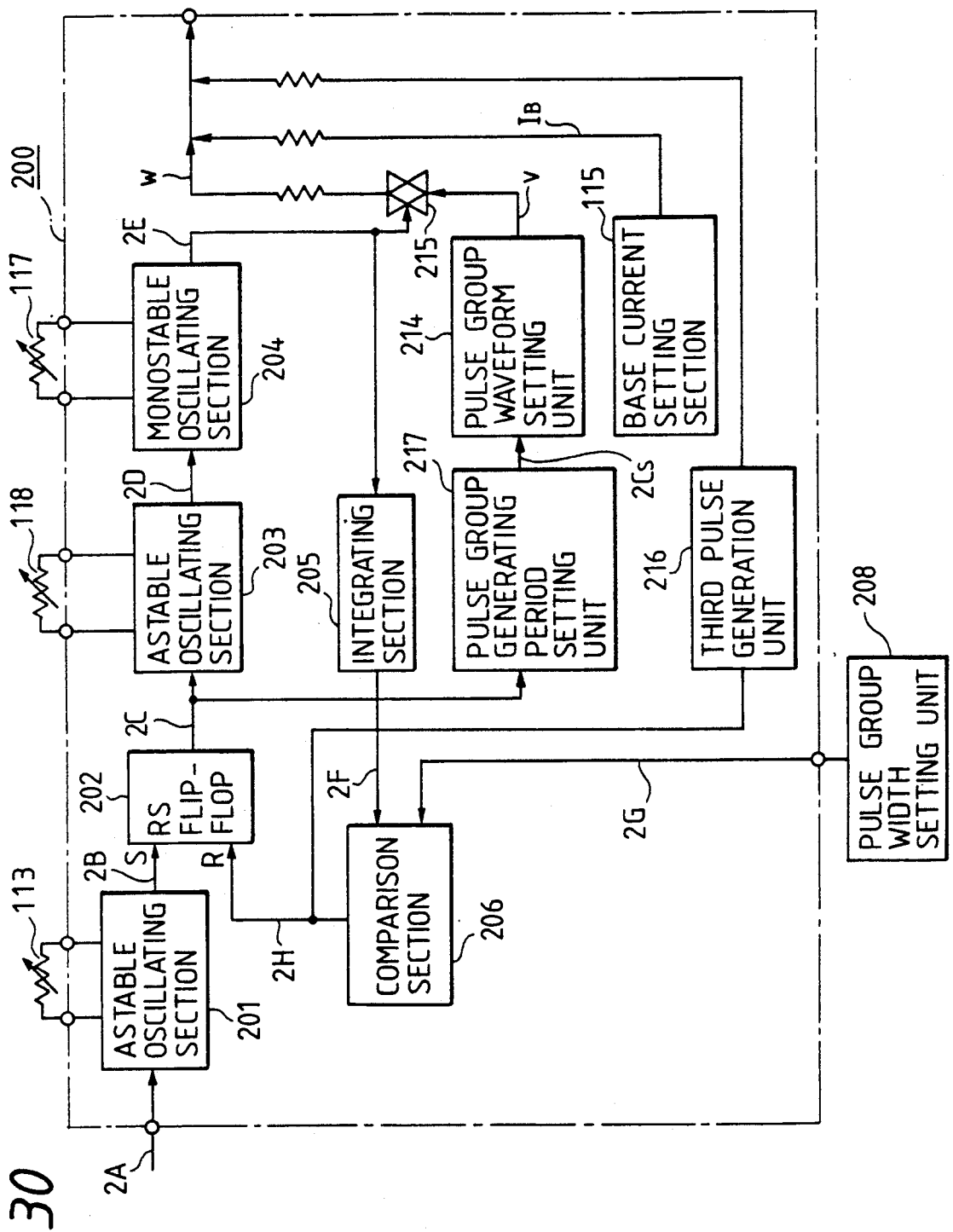
Figure 29B:
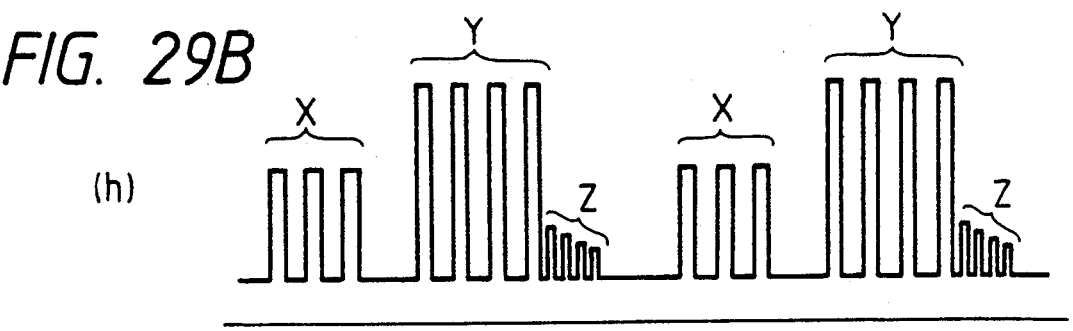
Figure 31:
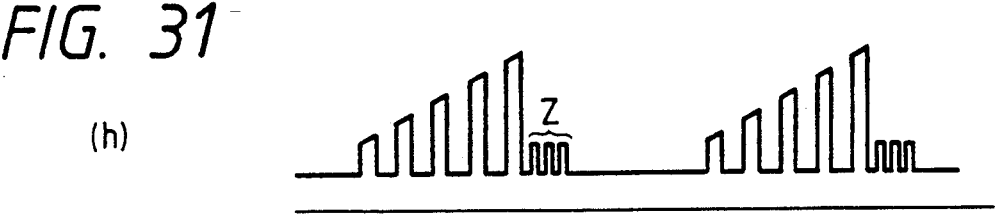
FIG. 31 is a time chart showing a pulse arc current waveform provided by the circuit of FIG. 30, and FIGS. 32 through 35 are time charts showing other examples of the pulse arc current waveform shown in FIG. 31.
Figure 32:
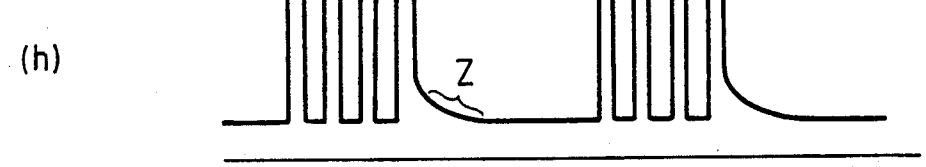
Figure 33:
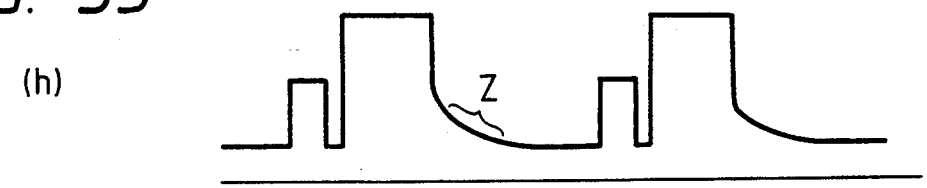
Figure 34:
Figure 35:
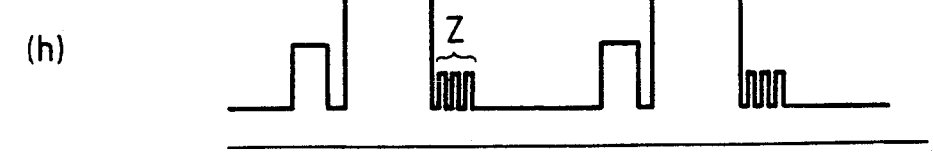

FIGS. 29 and 30 are block diagrams showing the arrangement of a pulse current waveform control circuit for shaping a pulse arc current waveform according to the fourth aspect of the invention.

In these figures, reference numeral 200 designates a waveform shaping section; 201 and 203, astable oscillating section; 204, an RS flip-flop; 205, an integrating circuit section; 206, a comparator; 208, a pulse group width or pulse width setting unit; 207, a wire feeding instructing section; 211, an amplifier; 212, a delay circuit for delaying a second pulse or second pulse group generation time instant; 213, a variable resistor for setting the second pulse or second pulse group generation time instant; 214, a pulse group waveform setting unit for setting a pulse group peak value waveform; 215, an analog switch; and 216, a third pulse generating unit for generating a third pulse or third pulse group.

The operation of the welding machine shown in FIG. 18 will be described.

First the pulse peak value $I_P$ setting unit 116, the pulse width $\tau$ setting unit 117, and the pulse period $C_A$ setting unit 118 output a pulse peak value $I_P$ signal, a pulse Width signal, and a pulse period $C_A$ signal, respectively, which are applied to the pulse waveform shaping unit 111. That is, a pulse signal having the pulse peak value $I_P$, the pulse width and the pulse period $C_A$ is applied to the pulse waveform shaping unit 111. The pulse waveform shaping unit 111, receiving a pulse group period $C_B$ signal and a pulse group duration X signal respectively from the pulse group period $C_B$ setting unit 113 and the pulse group duration X setting unit 114, shapes the pulse signal into an intermittent pulse group waveform as shown in FIG. 19. The pulse current signal thus shaped and a current signal detected by the current detector 6 are applied to the inverter drive circuit 119, as a result of which the circuit 119 applies an inverter drive signal corresponding to the pulse arc current waveform i as shown in FIG. 19 to the inverter circuit section 10 to drive the circuit 10.

Through the driving of the inverter circuit section, a shaped AC waveform is applied to the high frequency transformer 7. The output signal of the high frequency transformer 7 is rectified into a DC waveform by means of the high frequency diodes $8_A$ and $8_B$, so that the pulse arc current waveform i as shown in FIG. 19 is supplied to the welding section, namely, the arc load section 3.

In the arc load section 3, while the pulse arc current waveform i is being supplied thereto, the wire electrode 32 is continuously fed by an electric motor (not shown). Therefore, with the aid of the pulse arc current waveform i, pulse arc discharge is caused, as indicated at 33, between the wire electrode 32 and the material 34 to be welded (hereinafter referred to as "a welding material 34", when applicable), so that the end portion of the wire electrode 32 and the welding material 34 are melted thereby. The molten part of the wire electrode is allowed to continuously drop on to the melted part of the welding material 34, to achieve the welding of the material 34. In this operation, it goes without saying that the wire electrode 32 is continuously consumed. In order to complement this consumption, the wire electrode 32 is continuously fed to the welding torch 31.

The high frequency characteristic of the pulse arc current waveform i will be described in more detail.

Figure 7A:
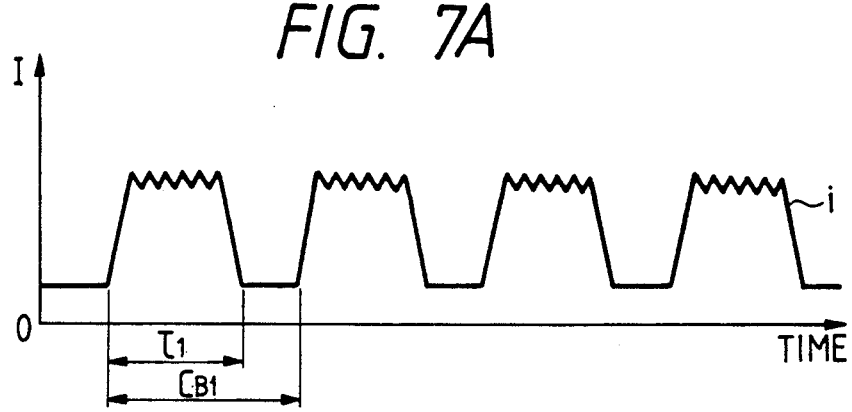
FIGS. 7A and 7B are time charts showing examples of a pulse arc discharge current in the pulse arc discharge welding apparatus shown in FIG. 6.
Figure 7B:
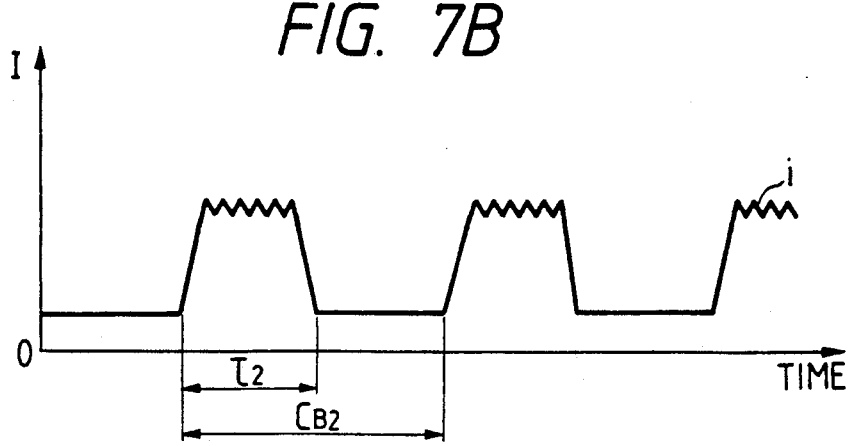
Figure 9A:
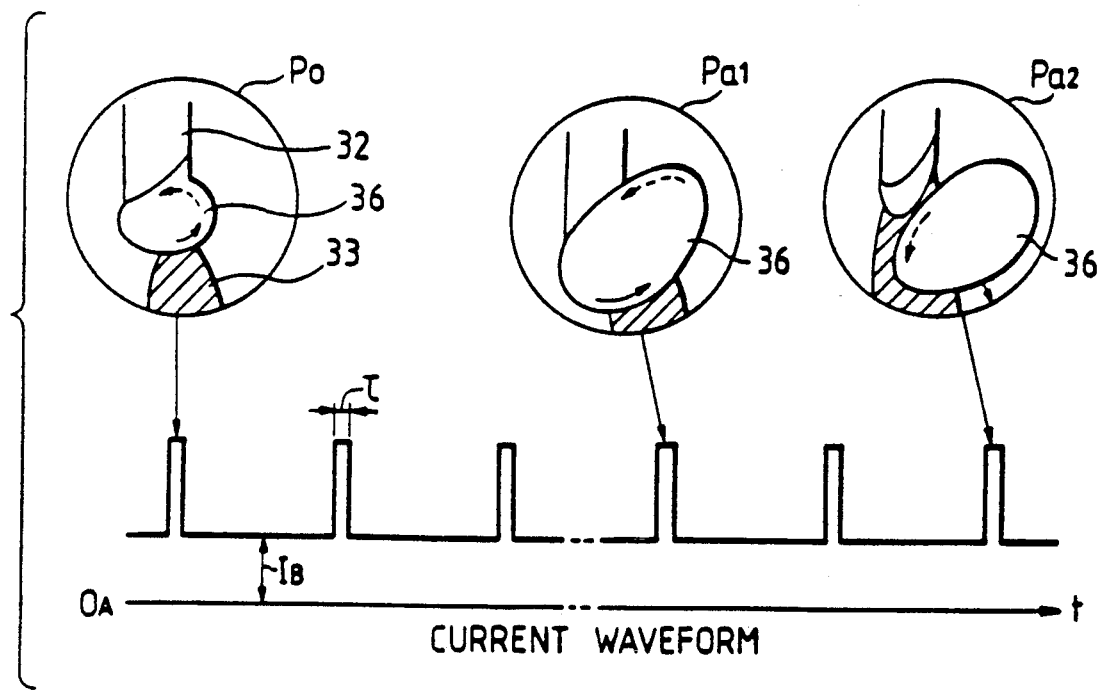
FIGS. 9A and 9B are explanatory diagrams showing pulse arc discharge current waveforms and the transfer of molten droplets in the conventional pulse arc discharge welding apparatus.
Figure 9B:
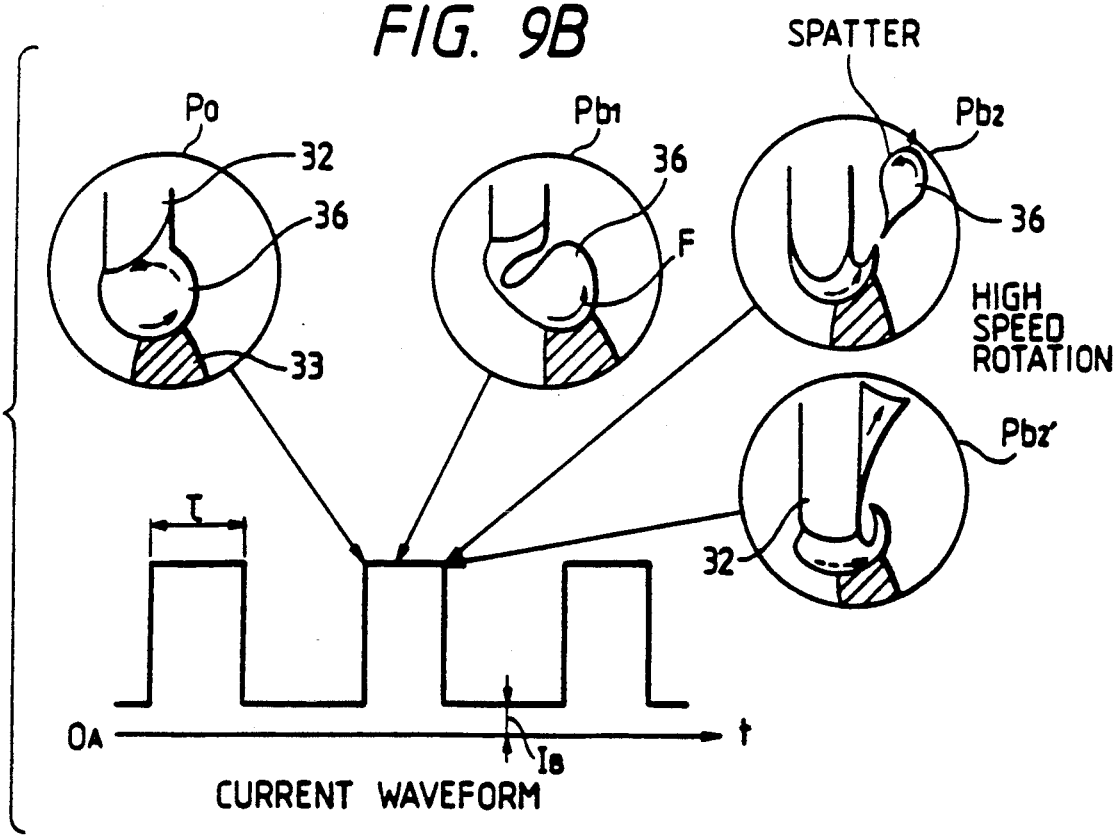
Figure 10A:
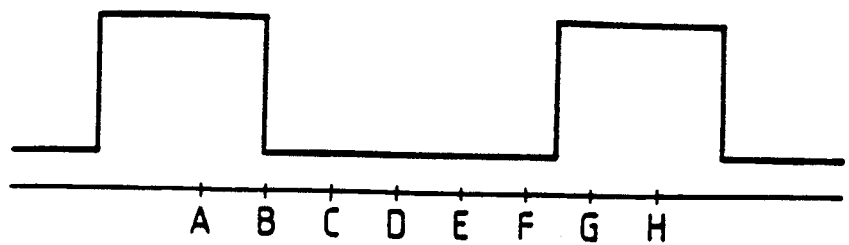
FIGS. 10A and 10B are diagrams showing a pulse arc discharge current waveform in the conventional pulse arc discharge welding apparatus, and spatters formed when the molten pool contacts the wire electrode when vibrated.
Figure 10B:
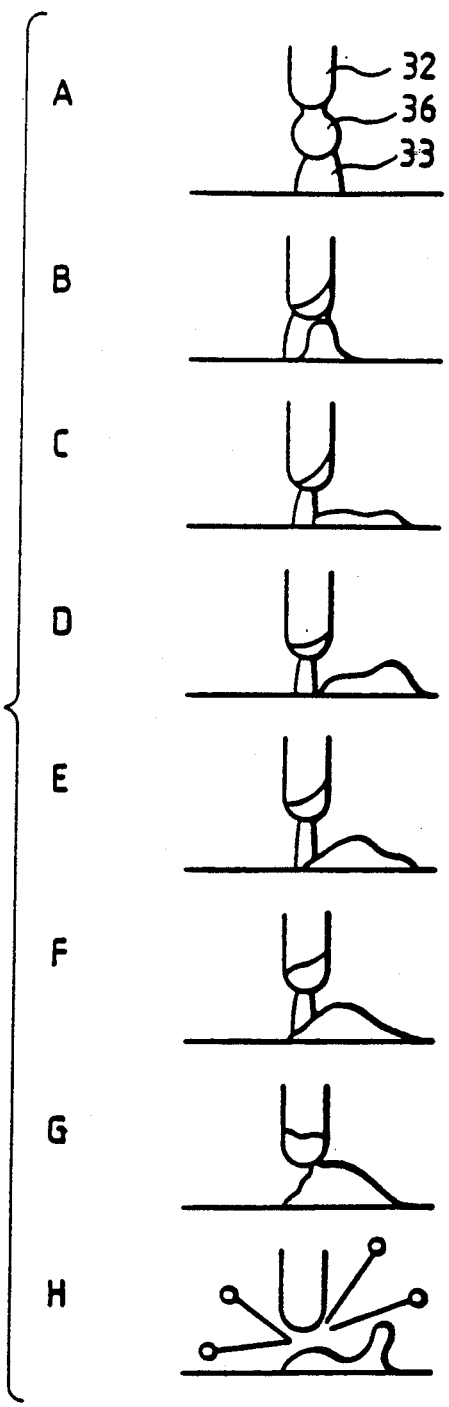
Figure 11A:
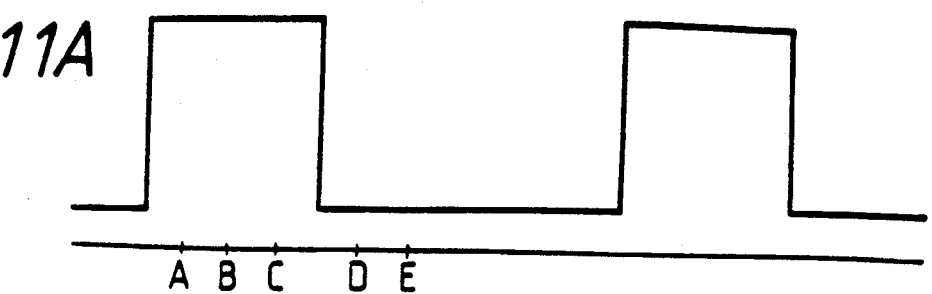
FIGS. 11A and 11B are diagrams showing a pulse arc discharge current waveform in the conventional pulse arc discharge welding apparatus, and the discontinuation of arc caused at the transfer of a molten droplet.
Figure 11B:
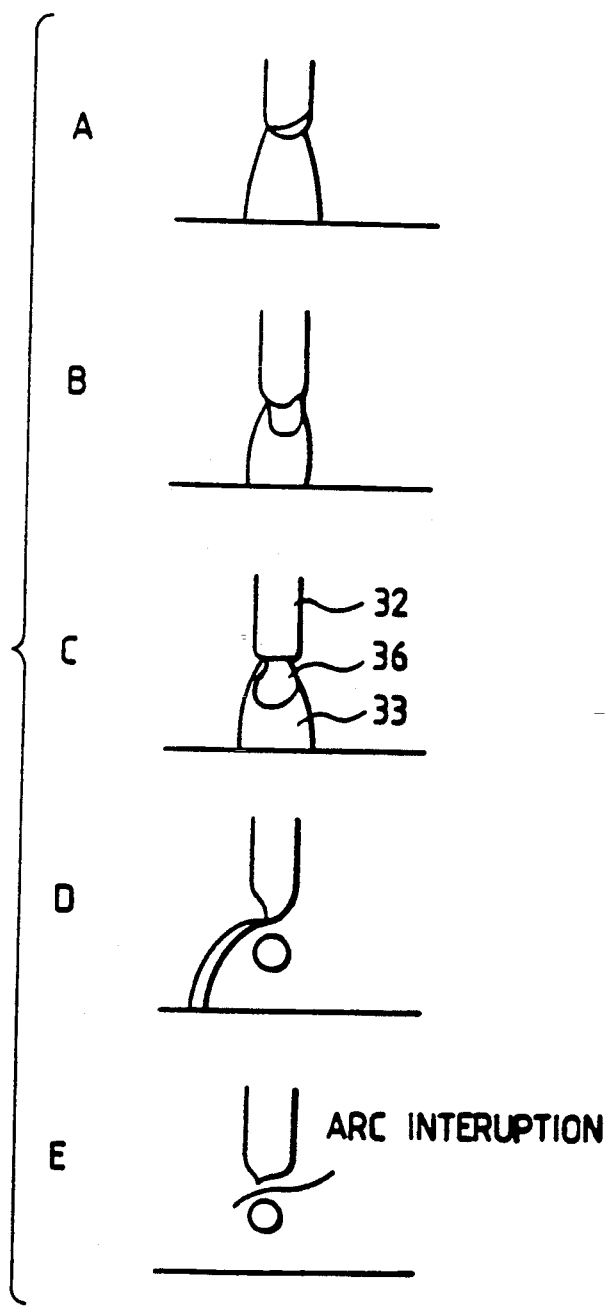

When one pulse current shown in FIG. 7A or 7B is converted into a pulse current group X consisting of a plurality of pulse currents as shown in FIG. 19, then the pulse arc discharge will show a high frequency characteristic, with the result that a molten droplet formed at the end of the wire electrode can readily leave the wire electrode. More specifically, with the molten droplet length $\lambda$ as shown in FIG. 8 with which the molten droplet can leave the wire electrode; in other words, even with such a small diameter, the molten droplet is allowed to leave the wire electrode. That is, even when the pulse peak current value $I_P$ is not so high, the molten droplet is allowed to leave the wire electrode with shaded regions 18 and 19 in FIG. 20; that is, the welding operation can be achieved satisfactorily.

This will be described with reference to FIG. 19 in more detail.

When each pulse current's pulse width $\tau$ is made shorter, and such pulse currents occur intermittently in each pulse current group, then the time of application of electromagnetic force induced by the pulse currents becomes intermittent. Therefore, while the pulse current is being applied, the force acting on the molten droplet 36 formed at the end of the wire electrode is essentially the electromagnetic force F corresponding to the pulse peak current value $I_P$. When the application of the pulse current is suspended, forces attributing to the reaction against the electromagnetic force due to the application of the pulse current, and to the gravity of the molten droplet itself act, as a pinch force P, on the molten droplet 36. Thus, the molten droplet formed at the end of the wire electrode 32 will be oscillated at the pulse frequency of the pulse current group X. The oscillation of the molten droplet readily forms a so-called "neck" between the wire electrode and the molten droplet with the region of the pulse peak current value I with which heretofore the formation of the "neck" has been difficult. As a result, the molten droplet 36 can readily leave the wire electrode. Thus, under the condition that the prior art cannot reduce the size of a molten droplet leaving the wire electrode at all, the invention can achieve the reduction in size of a molten droplet.

A welding operation reducing the size of a molten droplet leaving the wire electrode and transferring it onto the welding material regularly with the pulse current group X as described above will result in formation of welding beads fine in quality. Therefore, it is necessary to cause the pulse current group X to occur with a predetermined period $C_B$ which consists of a plurality of pulse currents having a pulse interval $T_A$ and a pulse width $\tau$.

The range of welding can be increased by making the average welding current and the wire electrode feeding speed correspond to the repetitive period of the pulse current group X.

Reference pictures are to show, in a sense of comparison the surface and section of a welding beam formed with the conventional pulse arc discharge welding appartus using a 100% $CO_2$ atmospheric gas, and those of a welding beam formed with the welding machine of the invention. As is apparent from the reference pictures, with the welding machine of the invention, no spatters are found on the surface of the welding bead, and the configuration of penetration or the depth of penetration is substantially uniform; that is, the welding bead formed is excellent in quality.

The operation of the pulse arc discharge welding apparatus according to the first aspect of the invention, more specifically the operation of the pulse current waveform control circuit 111 shown in FIG. 22 will be described with reference to time charts in the parts (a) through (h) of FIG. 23.

Figure 23:
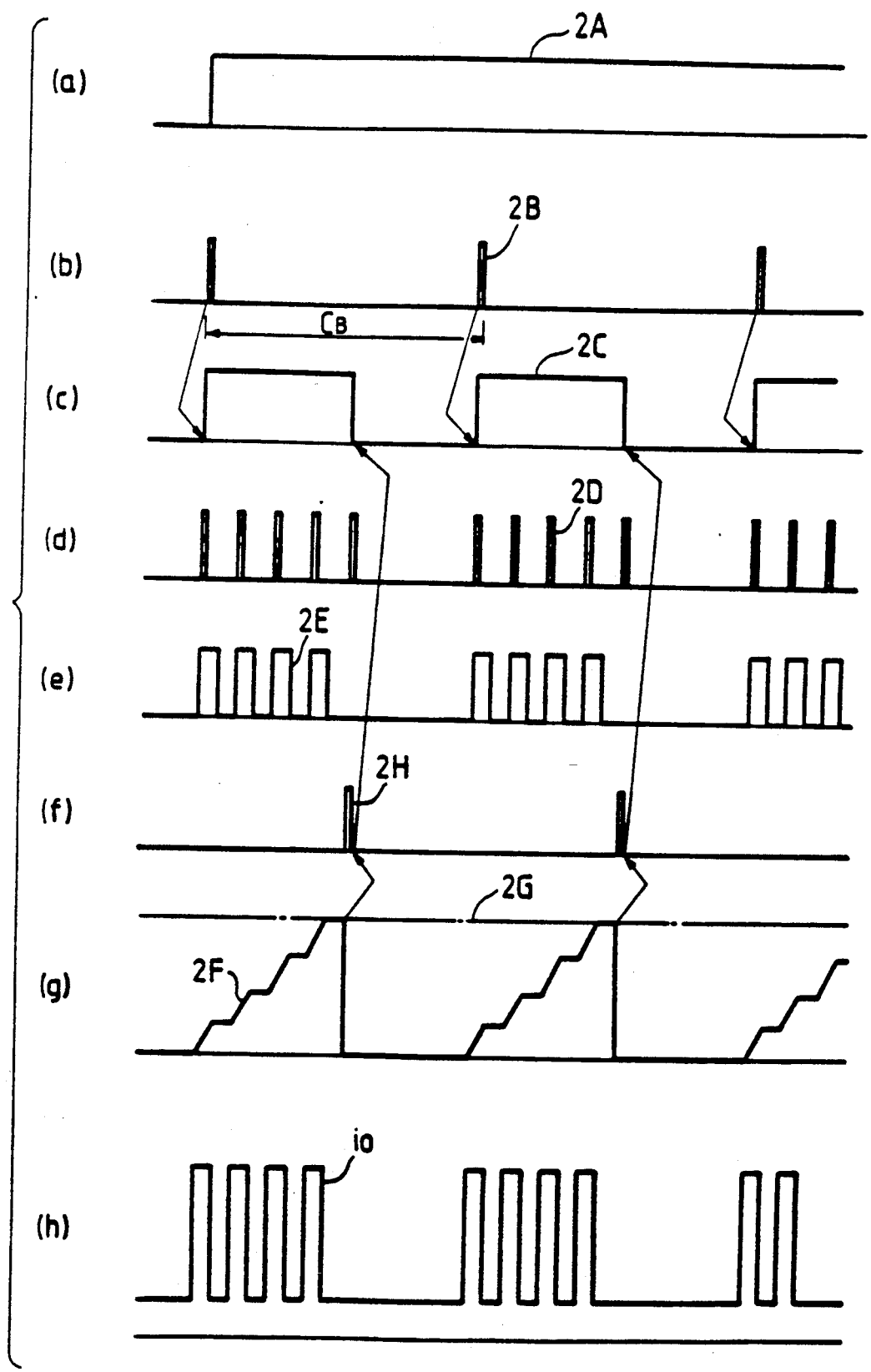
FIG. 23 is time charts for a description of the operation of the circuit shown in FIG. 22.

In response to a start signal 2A (cf. the part (a) of FIG. 23), the astable oscillating section (astable flip-flop) 201 operates to provide an output signal 2B, the oscillation period of which is set to $C_B$ by means of a variable resistor 113; that is, a pulse signal (cf. the part (b) of FIG. 6) is applied to the RS flip-flop 202 with the period $C_B$. The variable resistor 113 is operatively coupled to the wire feeding instructing section 207, to issue a wire feeding speed instruction. That is, a wire feeding speed $V_w$ is changed in correspondence to the oscillation period $C_B$ by means of the variable resistor 113.

In the RS flip-flop 202, the output signal 2C (cf. the part (c) of FIG. 23) is set to "H" with the pulse signal 2B, and is reset to "L" with a pulse signal 2H (cf. the part (f) of FIG. 23). Receiving the output signal 2C, the astable oscillating section (astable flip-flop) 203 applies a pulse output signal 2D (cf. the part (d) of FIG. 23) to the monostable oscillating section (monostable flip-flop) 204 with an oscillation period $C_A$ set with a variable resistor 118 for the period that the signal 2C is at "H". In the monostable oscillating section 204, the pulse width $\tau$ of the pulse output signal 2D every period $C_A$ is determined With a variable resistor 117 so that an output signal 2F (cf. the part (e) of FIG. 23). The output signal 2E is applied both to the amplifier 211 and to the integrating section 205. The integrating section 205 applies the signal 2F to the comparison section 206 which is obtained by integrating the output signal E with time. In the comparison section 206, the integrated signal 2F and a signal 2G are subjected to comparison. If the signal 2F is larger than the signal 2G, then the output signal is raised to "H" while the integrated signal 2F is reset (cf. the part (g) of FIG. 23). As a result, the output signal 2H is applied to the reset terminal of the RS flip-flop 202.

The output signal of the monostable oscillating section 204 together with the signal $I_B$ of the base current setting section 115 is applied to the amplifier 211, where the input signal 2E and the signal $I_B$ are combined and amplified to form an output signal $i_o$ (cf. the part (h) of FIG. 23). The amplification factor; i.e., the setting of the pulse current value $I_P$ is adjusted with a variable resistor 116. The output signal $i_o$ and the actually flowing arc current i are subjected to comparison with the current detector 6, and a drive circuit 301 applies an instruction signal to the high frequency inverter 10 in FIG. 18 so that the arc current gradually approaches the output signal $i_o$.

In the above-described first embodiment of the invention; i.e., in the pulse arc discharge welding apparatus according to the first aspect of the invention, the discharge current waveform is of the pulse current group X consisting of a plurality of pulse currents which are constant in pulse peak current value $I_P$, pulse interval $T_A$, and in base current $I_B$. However, the discharge current waveform may be modified as shown in FIGS. 33 through 43; that is, high frequency pulses may be formed in each pulse current group X. In this case, the effect is the same as described above.

Figure 36:
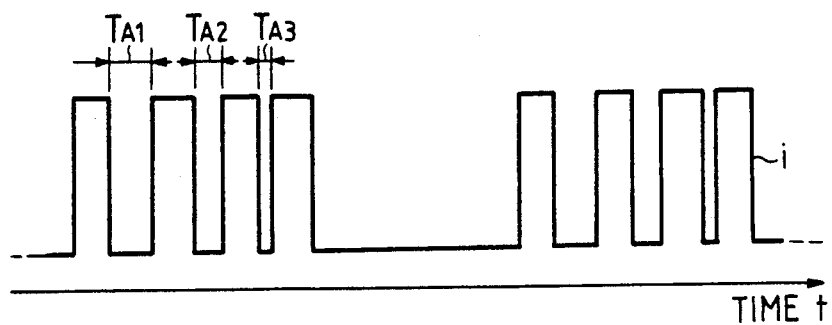
FIGS. 36 through 43 are time charts showing other examples of a pulse arc discharge current waveform in the discharge welding apparatus according to the first aspect of the invention.

In the case of FIG. 36, in each pulse current group X, the pulse interval is decreased every pulse as indicated by $T_{A1}$, $T_{A2}$ and $T_{A3}$.

Figure 37:
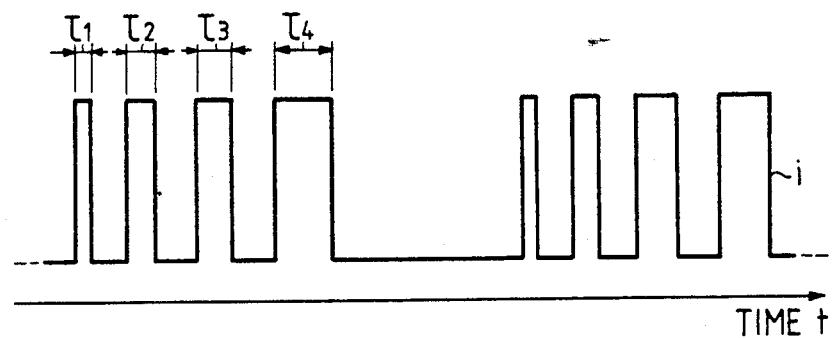

In the case of FIG. 37, the pulse width is increased every pulse as indicated by $\tau_1$, $\tau_2$, $\tau_3$ and $\tau_4$.

Figure 38:
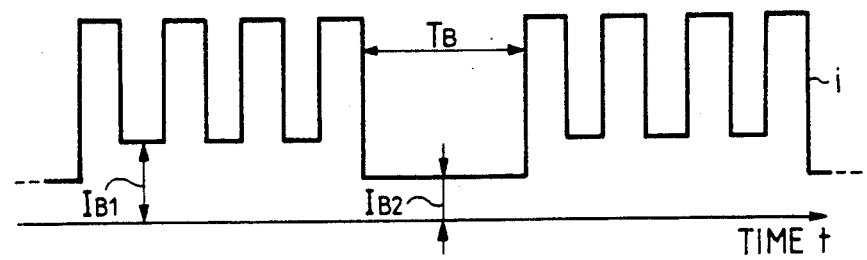

In the case of FIG. 38, the first base current $I_{B1}$ in each pulse current group X is made constant and higher than the second base current $I_{B2}$ in the repetitive interval $T_B$ of the pulse current group X.

Figure 39:
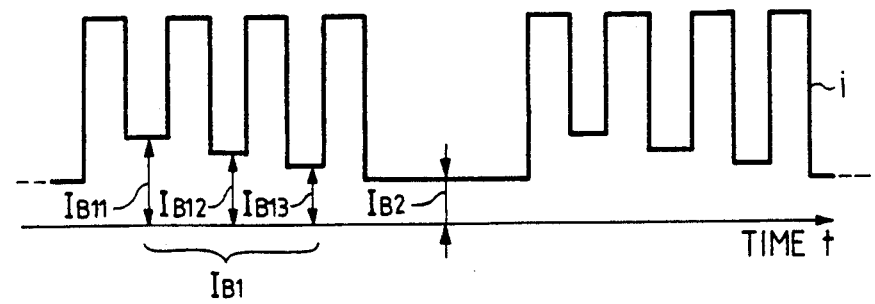

In the case of FIG. 39, the first base current is higher than the second base current $I_{B2}$, but is decreased stepwise as indicated by $I_{B11}$, $I_{B12}$ and $I_{B13}$.

Figure 40:
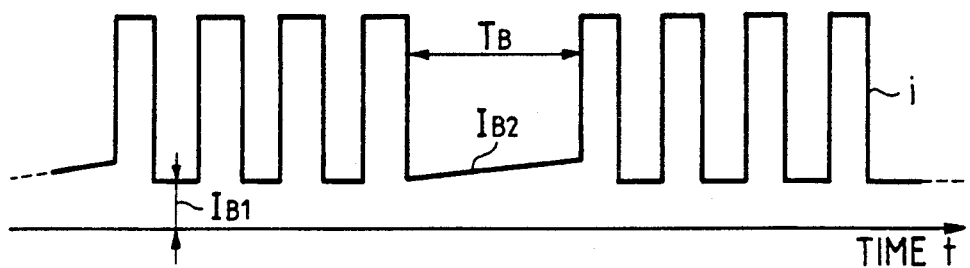

In the case of FIG. 40, the second base current $I_{B2}$ is increased with time.

Figure 41:
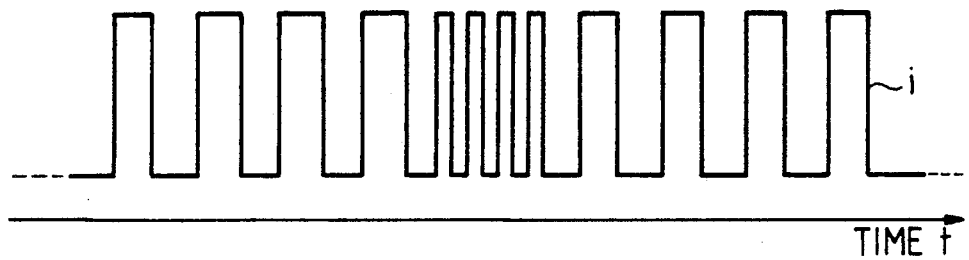
Figure 42:
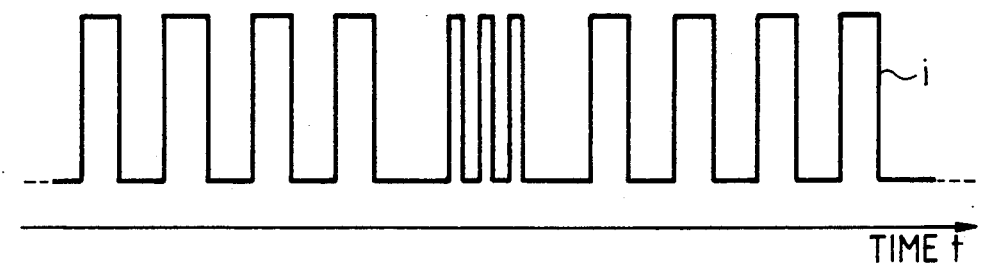
Figure 43:
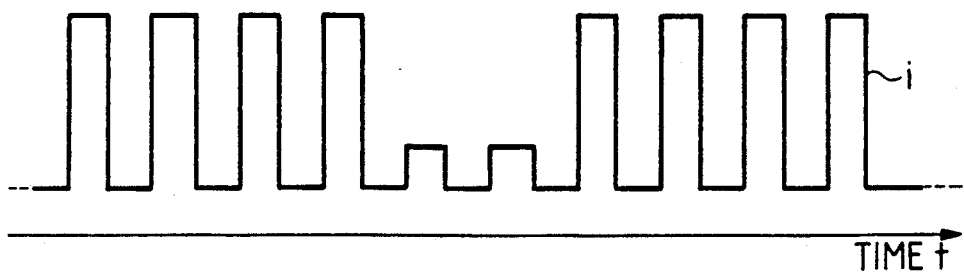

In the cases of FIGS. 41, 42 and 43, pulse current having a pulse width and a pulse peak current value which are equal to or smaller than those of the pulse current group X is superposed on the second base current $I_{B2}$.

With those modifications of the discharge current waveform, the molten drop formed at the end of the wire electrode is allowed to readily leave the wire electrode.

The operation of the pulse arc discharge welding apparatus according to the third aspect of the invention will be described with reference to FIGS. 24A to 25B.

FIG. 24A shows one example of a control circuit in a pulse arc discharge welding apparatus using two pulse waveforms. FIG. 25A shows one example of a control circuit in a pulse arc discharge welding apparatus using a pulse waveform having the function of the welding machine according to the first aspect of the invention.

The circuits shown in FIGS. 24A and FIG. 25A correspond to the waveform control section 200 in FIG. 22. In the circuits, an inverter drive circuit 119 and a pulse peak setting section 210 are not shown because they are the same as those in FIG. 22.

In FIGS. 24A and 25A, the oscillation period of a signal 2B is set to $C_B$ by means of a variable resistor 113, so that the pulse signal is outputted with the period $C_B$. The signal 2B is applied to a first pulse or first pulse group waveform setting unit (X). The signal 2B is further applied to a delay circuit 212, where it is delayed a period $C_{BS}$. The output of the delay circuit 212 is applied to a second pulse or second pulse group waveform setting unit (Y).

The delay circuit 212, as shown in FIG. 26, comprises an RS flip-flop 212-A, a predetermined resistor 212-B, diodes 212-D1 and 212-D2, capacitors 212-C1 and 212-C2, buffers 212-E1 and 212-E2, and an OR circuit element 212F. The delay circuit 212 is so designed that the timing of generation of the second pulse or second pulse group can be controlled with a variable resistor 213, and the delay time $C_{BS}$ is set to a predetermined time A, even if an attempt is made to set it over the determined time A.

Figure 24B:
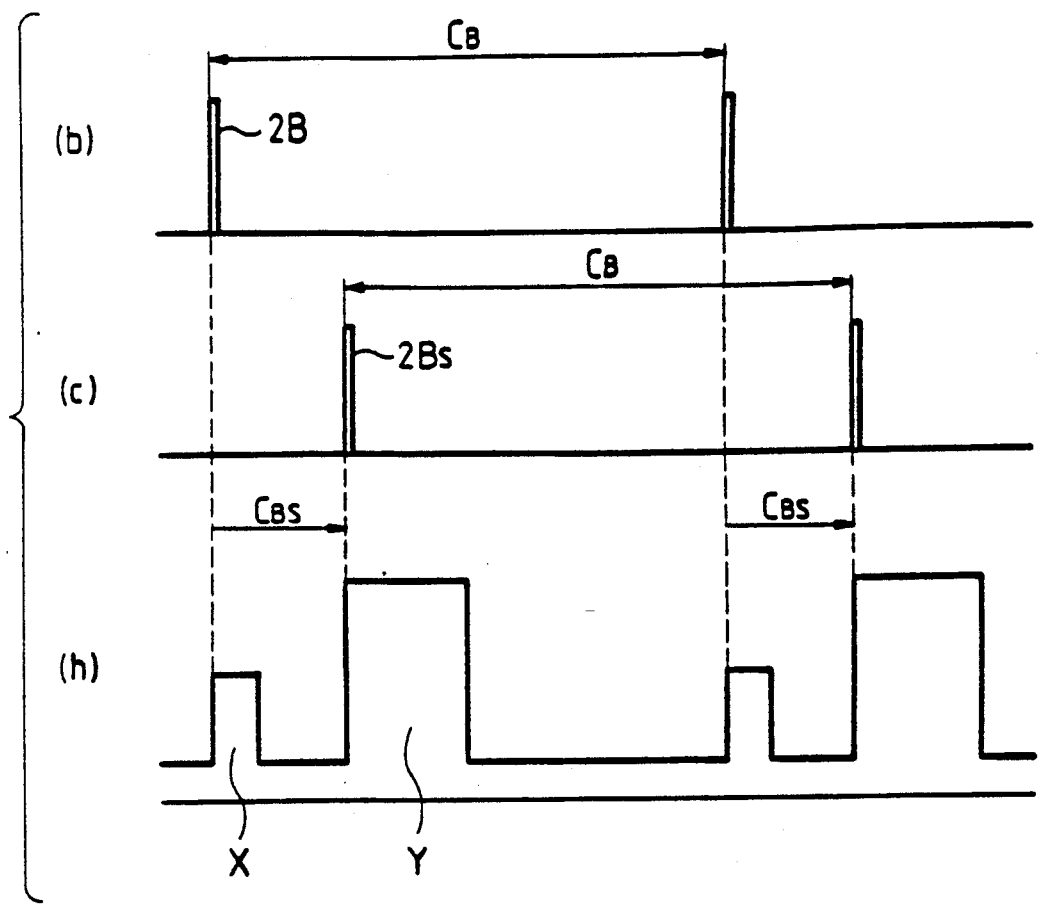

The signals of the first pulse or first pulse group waveform setting circuit (X) and of the second pulse or second pulse group waveform setting circuit (Y) are combined to form a waveform as indicated at (h) in FIG. 24B or 25B.

The operation of the pulse arc discharge welding apparatus according to the third aspect of the invention will be described with reference to FIG. 27 and FIGS. 28A and 28B.

In FIG. 27, the behavior of signals 2A, 2B, 2E, 2F, 2G and 2H is similar to that in FIG. 22.

Further in FIG. 27, a pulse group waveform setting unit 214 can output a desired waveform for the period of time that the input signal is held at "H", as shown in the part (v) of FIG. 28B. When the signal 2C is at "H", the pulse group waveform setting unit 214 applies the output waveform v to an analog switch 215. A signal 2C setting a predetermined pulse group time (predetermined period of time B) is applied to a pulse group generating period setting unit 217. The pulse group generating period setting unit 217, as shown in FIG. 28A, comprises: an RS flip-flop 217-A; a predetermined circuit resistor 217-B; a diode 217-D; a capacitor 217-C; a buffer 217-E, and an OR circuit element 217-F. When the predetermined period of time B is longer than a predetermined period of time A, the output signal $2C_s$ of the pulse group generating period setting unit 217 is held at "H" for the predetermined period of time B; and when the former B is shorter than the latter A, the output signal $2C_s$ is held at "H" for the predetermined period of time A.

output signal $2C_s$ of the pulse group generating period setting unit 217 is applied to the pulse group waveform setting unit 214. The latter 214 applies the output waveform v to the analog switch 215 while the output signal $2C_s$ is held at "H". The signal 2E (the part (e) of FIG. 28B) is applied to the gate of the analog switch 215, so that, when the gate is at "H", the analog switch 214 receives the waveform v and outputs a waveform w. The output signal $I_B$ of the base current setting unit 115 is superposed on the waveform w, to form a waveform h.

The operation of the pulse arc discharge welding apparatus according to the fourth aspect of the invention will be described with reference to FIGS. 29A and 30. FIG. 29A is obtained by adding a third pulse generator 216 to the control circuit of FIG. 25A. Similarly, FIG. 30 is obtained by adding a third pulse generator to the control circuit of FIG. 27.

In FIGS. 29A and 30, at the end of the pulse or pulse group, the output signal 2H of a comparator 206 or 206b is applied, as a trigger signal, to the third pulse generator 216 so that the generator 216 outputs a third pulse group z for a predetermined period of time.

FIGS. 32 through 35 show other examples of the waveform provided by the circuit of FIG. 29A or 30.

Figure 44A:
FIGS. 44A and 44B are diagrams showing a bead surface and a cross section of a welding portion in a longitudinal direction, which are obtained by the conventional welding apparatus.
Figure 44B:
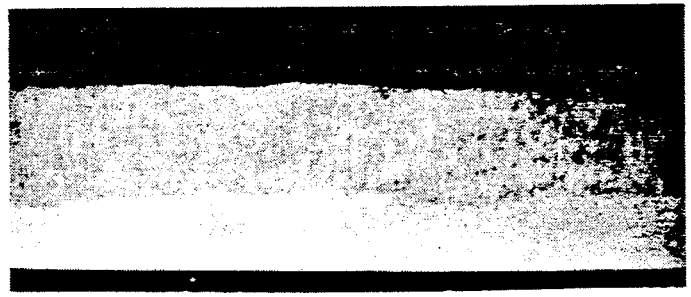
Figure 45A:
FIGS. 45A to 45C are diagrams showing a bead surface, a cross section in the same direction as that of FIG. 44B, and a cross section of the welding portions which are obtained under the same condition as above.
Figure 45B:
Figure 45C:

FIGS. 44A and 44B are diagrams showing a bead surface and a cross section of a welding portion in a longitudinal direction, which are obtained by the conventional welding appratus under the conditions that the diameter of a wire electrode is 1.2 mm, the welding speed is 800 mm/min, the feeding speed of the wire electrode is 7 m/min, and the thickness of a material to be welded is 3.2 mm. FIGS. 45A to 45C are diagrams showing a bead surface, a cross section in the same direction as that of FIG. 44B, and a cross section of the welding portion (corresponding to FIGS. 15A and 15B) which are obtained under the same conditions as above. As is apparent from the above figures, the present invention is advantageous in the welding condition.

As described above, according to the second aspect of the invention, the discharge current waveform for a pulse arc discharge welding apparatus is divided into a group of plural pulse current having at least one kind of pulse width and at least one kind of pulse interval (forming a high frequency pulse group), and the continuous base current is superposed on the high frequency pulse group occurring with a certain period. Accordingly, the pulse arc discharge can be carried out in a high frequency mode, as a result of which a molten droplet transferring onto a material to be welded is reduced in size, and the transfer of molten droplets is carried out regularly. In addition, the resultant welds are high in quality, and the welding machine can be made compact, and can be controlled with high accuracy.

According to the third aspect of the invention, the discharge current waveform of the pulse arc discharge welding apparatus is divided into two kinds of pulse or high frequency group currents; a first pulse or first high frequency pulse group current and a second pulse or second high frequency pulse group current, and the continuous base current is superposed on the first pulse or first high frequency pulse group current and the second pulse or second high frequency pulse group current occurring periodically in pair with the first pulse or first high frequency pulse group current made smaller than the second pulse or second high frequency pulse group current. The first pulse or first high frequency pulse group can eliminate the difficulty that the molten pool contacts the wire electrode when vibrated by pulses, thus forming spatters.

According to the fourth aspect of the invention, the discharge current waveform for the pulse arc discharge welding apparatus is divided into a group of pulse currents having at least one kind of pulse width and at least one kind of pulse interval (a high frequency pulse group), and with the peak value of the high frequency pulse group increased with time, the continuous base current is superposed on the high frequency pulse group occurring periodically. Therefore, similarly as in the case of the pulse arc discharge welding apparatus according to the first aspect of the invention, a molten droplet transferring onto the material to be welded can be reduced in size, and in addition, the transfer of molten droplets is carried out more regularly than in the welding machine according to the first aspect of the invention. Furthermore, similarly as in the welding machine according to the second aspect of the invention, in the welding machine according to the third aspect of the invention the difficulty is eliminated that the molten pool contacts the wire electrode when vibrated by pulses, thus forming spatters.

According to the fifth aspect of the invention, the discharge current waveform for the pulse arc welding machine is modified in such a manner that the third pulse or third high frequency pulse group follows the high frequency pulse group provided according to the first or third aspect of the invention or the pulse or high frequency pulse group provided according to the second aspect of the invention. Therefore, the discontinuation of arc which otherwise may be caused when the molten droplet is transferred at the end of the pulse or high frequency pulse group can be eliminated with the third pulse or third high frequency pulse group.

What is claimed is:

1. A pulse arc discharge welding apparatus comprising:
   a pulse current waveform control circuit for outputting a series of current pulses provided in pulse current groups, said pulse current groups being spaced apart by a predetermined interval, said current pulses each having a duration that is short relative to a duration of said pulse current groups and to said predetermined interval, said control circuit including base current output means for outputting at least one predetermined continuous base current and superimposing means for superimposing said pulse current groups on said at least one predetermined continuous base current;
   pulse arc current supplying means for outputting a pulse arc current according to an output of said pulse current waveform control circuit; and
   arc welding means for performing pulse arc discharge with an output of said pulse arc current supplying means, to carry out a pulse arc welding operation.

2. A pulse arc discharge welding appartus as claimed in claim 1 wherein said pulse current waveform control circuit comprises means for outputting said current pulses within said pulse current groups that are equal in current value to one another.

3. A pulse arc discharge welding appartus as claimed in claim 1 wherein said pulse current waveform control circuit comprises means for outputting first and second pulse current groups periodically, said base current output means cooperating with said superimposing means so as to provide a base current duration such that within a predetermined time duration, the first pulse current group is outputted first, followed by the second pulse current, and then the base current duration, and wherein
said means for outputting said first and second pulse current groups comprises means for setting plural pulse current values forming said first pulse current group smaller than the plural pulse current values forming said second pulse current group.

4. A pulse arc discharge welding apparatus as claimed in claim 1 further comprising means for increasing gradually, over time, current values of said plurality of pulse currents forming each of said pulse current groups.

5. A pulse arc discharge welding appartus as claimed in claim 1 wherein said pulse current waveform control circuit comprises means for outputting second and third pulse current groups periodically, said means for outputting at least one predetermined base current cooperating with said means for superimposing said pulse current groups so as to provide a base current duration such that, within a predetermined time duration, the second pulse current group is outputted first, followed by the third pulse current group, and the base current duration, and wherein said means for outputting said second and third pulse current groups comprises means for setting the plural pulse current values forming said second pulse current group larger than the plural pulse current values forming said third pulse current group.

6. A pulse arc discharge welding apparatus as of said plurality of pulse currents forming each said second pulse current group.

7. A pulse arc discharge welding apparatus as claimed in claim 5 further comprising means for decreasing gradually, over time, current values of said plurality of pulse currents forming said third pulse current group.

8. A pulse arc discharge welding apparatus as claimed in claim 1 wherein said base current output means comprises means for outputting a first continuous base current having a first amplitude, and a second continuous base current having a second amplitude, said superimposing means superimposing said pulse current groups on said first continuous base current.

9. A pulse arc discharge welding apparatus as claimed in claim 8 wherein said base current output means comprises means for varying said first amplitude.

10. A pulse arc discharge welding apparatus as claimed in claim 8 wherein said base current output means comprises means for varying said second amplitude.

11. A pulse arc discharge welding apparatus as claimed in claim 1 wherein said pulse current waveform control circuit comprises means of said duration of said current pulses within each of said pulse current groups.

12. A pulse arc discharge welding apparatus as claimed in claim 1 wherein said pulse current waveform control circuit comprises means for varying an interval between consecutive ones of said current pulses within each of said pulse current groups.

13. A pulse arc discharge welding apparatus comprising:
supply means for supplying a base current having a constant value;
superposing means for superposing a pulse current having a constant peak value on said base current to maintain discharge arcs, said pulse current superperposed on said base current being supplied between a base material and a welding wire;
setting means for setting said constant peak value;
a detector for measuring a voltage between said base material and said welding wire to detect variation in a distance therebetween and providing an output accordingly;
control means, responsive to said output of said detector, for varying at least one of said constant peak value and said base current so as to control the effective current of a pulsed arc discharge while maintaining substantially constant the average current value of the pulsed arc discharge.

14. A pulse arc discharge welding apparatus as claimed in claim 13 wherein said control means comprises means for controlling the effective value of the pulse current as expressed by $\dot{I}=\sqrt{(1/T)(I_P^2 \cdot \tau + I_B^2)T-\tau))}$ while maintaining constant the average current as expressed by $\bar{I}=(1/T)(I_P\tau+I_B(T+\tau))$, respectively, where $I_P$ and $I_B$ are pulse peak current and base current, respectively, and $\tau$ is a pulse width.

15. A pulse arc discharge welding apparatus as claimed in claim 13 wherein said control means comprises means for varying said constant peak value.

16. A pulse arc discharge welding apparatus as claimed in claim 15 further comprising:
means for setting a welding voltage; and
comparing means for comparing said output of said detector and said welding voltage and providing an output accordingly;
wherein said means for varying said constant peak value is responsive to said output of said comparing means.

17. A pulse arc discharge welding apparatus as claimed in claim 13 wherein said control means comprises means for varying said base current.

18. A pulse arc discharge welding apparatus as claimed in claim 17 further comprising:
means for setting a welding voltage;
comparing means for comparing said output of said detector and said welding voltage and providing an output accordingly; and
inverter means for inverting said output of said comparing means to provide an inverted output;
wherein said means for varying said base current is responsive to said inverted output.

* * * * *